US012058558B2

United States Patent
Bae et al.

(10) Patent No.: US 12,058,558 B2
(45) Date of Patent: *Aug. 6, 2024

(54) METHOD AND APPARATUS FOR SYNCHRONIZING PACKET DUPLICATION OPERATION BETWEEN BASE STATION NODES IN MOBILE COMMUNICATION SYSTEM

(71) Applicant: Samsung Electronics Co., Ltd., Gyeonggi-do (KR)

(72) Inventors: Beomsik Bae, Gyeonggi-do (KR); Donggun Kim, Gyeonggi-do (KR); Soenghun Kim, Gyeonggi-do (KR); Jungsoo Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,803

(22) Filed: Mar. 15, 2023

(65) Prior Publication Data

US 2023/0217296 A1 Jul. 6, 2023

Related U.S. Application Data

(63) Continuation of application No. 16/972,322, filed as application No. PCT/KR2019/007545 on Jun. 21, 2019, now Pat. No. 11,632,690.

(30) Foreign Application Priority Data

Jun. 21, 2018 (KR) .................. 10-2018-0071715
Dec. 17, 2018 (KR) .................. 10-2018-0163321

(51) Int. Cl.
*H04W 28/02* (2009.01)
*H04W 76/15* (2018.01)
(Continued)

(52) U.S. Cl.
CPC ....... *H04W 28/0252* (2013.01); *H04W 76/15* (2018.02); *H04W 76/20* (2018.02); *H04W 92/20* (2013.01)

(58) Field of Classification Search
CPC .. H04W 28/0252; H04W 92/20; H04W 76/15
See application file for complete search history.

(56) References Cited

U.S. PATENT DOCUMENTS 10,694,569 B2 * 6/2020 Jin ........................... H04L 1/08
10,959,279 B2 * 3/2021 Orsino ................. H04W 76/38
(Continued)

FOREIGN PATENT DOCUMENTS

| GB | 201800504 | 2/2018 |
|----|-----------|--------|
| WO | WO 2016/072501 | 5/2016 |
| WO | WO 2018/084760 | 5/2018 |

OTHER PUBLICATIONS

Spreadtrum Communcations, "Discussion on Activation/Deactivation of PDCP Duplication", R2-1804474, 3GPP TSG-RAN WG2 Meeting #101bis, Apr. 16-20, 2018, 4 pages.

(Continued)

*Primary Examiner* — Parth Patel
(74) *Attorney, Agent, or Firm* — The Farrell Law Firm, P.C.

(57) ABSTRACT

Methods and apparatuses are provided for activating or deactivating packet duplication in a wireless communication system. A central unit (CU) of a first base station transmits, to a distributed unit (DU) of the first base station, via an F1 interface, information to activate or deactivate a dual connectivity (DC) based packet duplication for a data radio bearer (DRB). The information is transmitted to a second base station. A medium access control (MAC) control element (CE) indicating whether to activate or deactivate (Continued)

(a) INTEGRATED DUAL CONNECTIVITY SUPPORT BASE STATION ARCHITECTURE
(b) CU-DU/CP-UP SEPARATED DUAL CONNECTIVITY SUPPORT BASE STATION ARCHITECTURE
(c) CU-DU/CP-UP SEPARATED SINGLE BASE STATION ARCHITECTURE packet duplication for the DRB, based on the information, is transmitted to a user equipment (UE).

15 Claims, 30 Drawing Sheets

(51) Int. Cl.
*H04W 76/20* (2018.01)
*H04W 92/20* (2009.01)

(56) References Cited

U.S. PATENT DOCUMENTS

| | | | | |
|---|---|---|---|---|
| 11,063,704 | B2* | 7/2021 | Zou | H04W 36/0069 |
| 11,116,024 | B2* | 9/2021 | Yu | H04W 40/12 |
| 11,212,695 | B2* | 12/2021 | Joseph | H04W 28/0236 |
| 11,343,169 | B2* | 5/2022 | Loehr | H04L 45/24 |
| 11,432,363 | B2* | 8/2022 | Kim | H04W 76/11 |
| 11,483,896 | B2* | 10/2022 | Jin | H04W 48/08 |
| 2015/0092707 | A1 | 4/2015 | Kwon | |
| 2017/0201603 | A1 | 7/2017 | Uchino et al. | |
| 2018/0098250 | A1 | 4/2018 | Vrzic et al. | |
| 2018/0132220 | A1 | 5/2018 | Jang et al. | |
| 2018/0279169 | A1* | 9/2018 | Wang | H04L 1/20 |
| 2018/0332501 | A1* | 11/2018 | Tseng | H04L 1/08 |
| 2018/0367288 | A1* | 12/2018 | Vrzic | H04W 36/22 |
| 2018/0368132 | A1* | 12/2018 | Babaei | H04L 1/1819 |
| 2018/0368200 | A1* | 12/2018 | Jin | H04L 1/189 |
| 2019/0082363 | A1* | 3/2019 | Park | H04W 36/0055 |
| 2019/0098533 | A1* | 3/2019 | Babaei | H04L 1/08 |
| 2019/0098682 | A1* | 3/2019 | Park | H04W 28/0257 |
| 2019/0253915 | A1* | 8/2019 | Joseph | H04W 24/10 |
| 2019/0268799 | A1* | 8/2019 | Hong | H04W 4/70 |
| 2019/0349139 | A1* | 11/2019 | Park | H04W 80/08 |
| 2020/0120559 | A1* | 4/2020 | Centonza | H04W 36/0072 |
| 2020/0153555 | A1* | 5/2020 | Shi | H04L 1/1614 |
| 2020/0163005 | A1* | 5/2020 | Rao | H04W 4/46 |
| 2020/0163140 | A1* | 5/2020 | Mochizuki | H04W 16/32 |
| 2020/0186292 | A1* | 6/2020 | Zou | H04W 76/15 |
| 2020/0187284 | A1* | 6/2020 | Turtinen | H04W 36/0069 |
| 2020/0205050 | A1* | 6/2020 | Shah | H04W 36/08 |
| 2020/0214073 | A1* | 7/2020 | Shimoda | H04W 76/27 |
| 2020/0305213 | A1* | 9/2020 | Teyeb | H04W 72/23 |
| 2020/0374964 | A1* | 11/2020 | Wang | H04W 88/06 |
| 2020/0389930 | A1* | 12/2020 | Park | H04W 76/15 |
| 2021/0112610 | A1* | 4/2021 | Xiao | H04L 1/1614 |
| 2021/0227606 | A1* | 7/2021 | Liu | H04W 28/06 |
| 2021/0243638 | A1* | 8/2021 | Bae | H04W 76/15 |
| 2021/0266786 | A1* | 8/2021 | Dudda | H04L 43/10 |
| 2021/0344446 | A1* | 11/2021 | Zou | H04W 76/27 |
| 2021/0368386 | A1* | 11/2021 | Zhao | H04W 28/02 |
| 2022/0021432 | A1* | 1/2022 | Zhou | H04W 74/0833 |
| 2022/0159602 | A1* | 5/2022 | Wei | H04L 65/611 |

OTHER PUBLICATIONS

ZTE, "DL PDCP Duplication Activation/Deactivation Over F1", R3-181740, 3GPP TSG-RAN WG3 NR#99bis, Apr. 16-20, 2018, 12 pages.

Panasonic, "Packet Duplication during the Handover", R2-1708573, 3GPP TSG-RAN WG2 Meeting #99, Aug. 21-25, 2017, 2 pages.

OPPO, "Control on UL Packet Duplication for DC Duplication", R2-1800153, 3GPP TSG-RAN 2 Meeting AH#1, Jan. 22-26, 2018, 4 pages.

ZTE, Further Discussion on Assistance Information for DL Duplication (de) activation, R3-181738, 3GPP TSG RAN WG3 NR#99bis, Apr. 16-20, 2018, 3 pages.

International Search Report dated Sep. 26, 2019 issued in counterpart application No. PCT/KR2019/007545, 22 pages.

Nokia et al., "More Consideration on Uplink Duplication in Dual Connectivity", R2-1709425, 3GPP TSG-RAN WG2 #99, Aug. 21-25, 2017, 2 pages.

OPPO, "PDCP Operation for UL Packet Duplication", R2-1800154, 3GPP TSG-RAN2 Meeting AH#1, Jan. 22-26, 2018, 4 pages.

European Search Report dated Jul. 7, 2021 issued in counterpart application No. 19823315.7-1215, 13 pages.

CATT, "Discussion on CA Based PDCP Duplication", R3-174533, 3GPP TSG-RAN WG3#98, Nov. 27-Dec. 1, 2017, 12 pages.

European Search Report dated Sep. 6, 2022 issued in counterpart application No. 19823315.7-1215, 11 pages.

Chinese Office Action dated Jul. 28, 2023 issued in counterpart application No. 201980041891.6, 24 pages.

Chinese Office Action dated Mar. 23, 2024 issued in counterpart application No. 201980041891.6, 24 pages.

EP Notice of Allowance dated Feb. 1, 2024 issued in counterpart application No. 19823315.7-1215, 79 pages.

EP Notice of Allowance dated Apr. 15, 2024 issued in counterpart application No. 19823315.7-1215, 79 pages.

\* cited by examiner

FIG. 5A

| IE/Group Name | Presence | Range | IE type and referemce | Semantics description | Criticality | Assigned Criticality |
|---|---|---|---|---|---|---|
| Message Type | M | | | | YES | reject |
| | | [...] | | | | |
| DRB to Be Setup List | | 1 | | | YES | reject |
| >DRB to Be Setup Item IEs | | 1 .. <maxnoofDRBs> | | | EACH | reject |
| >>DRB ID | M | | | | – | |
| >>Packet Duplication Indicator | | | ENUMERATED (enabled, disabled) | Indicates whether packet duplication is enabled. | – | |
| | | [...] | | | | |

(a-1) XnAP – S-NODE ADDITION REQUEST message (Alt.1)

| IE/Group Name | Presence | Range | IE type and referemce | Semantics description | Criticality | Assigned Criticality |
|---|---|---|---|---|---|---|
| Message Type | M | | | | YES | reject |
| | | [...] | | | | |
| DRB to Be Setup List | | 1 | | | YES | reject |
| >DRB to Be Setup Item IEs | | 1 .. <maxnoofDRBs> | | | EACH | reject |
| >>DRB ID | M | | | | – | |
| >>DC Packet Duplication Indicator | | | ENUMERATED (enabled, disabled) | Indicates whether DC-based packet duplication is enabled. | – | |
| >>CA Packet Duplication Indicator | | | ENUMERATED (enabled, disabled) | Indicates whether CA-packet duplication is enabled. | – | |
| | | [...] | | | | |

(a-2) XnAP – S-NODE ADDITION REQUEST message (Alt.2)

FIG. 5B

| IE/Group Name | Presence | Range | IE type and referemce | Semantics description | Criticality | Assigned Criticality |
|---|---|---|---|---|---|---|
| Message Type | M | | | | YES | reject |
| [...] | | | | | | |
| DRB to Be Setup List | | 1 | | | YES | reject |
| >DRB to Be Setup Item IEs | | 1 .. <maxnoofDRBs> | | | EACH | reject |
| >>DRB ID | M | | | | – | |
| >>Packet Duplication Indicator | | | ENUMERATED (enabled, disabled) | Indicates whether packet duplication is enabled. | – | |
| [...] | | | | | | |
| DRB to Be Modified List | | 0..1 | | | YES | reject |
| >DRB to Be Modified Item IEs | | 1 .. <maxnoofDRBs> | | | EACH | reject |
| >>DRB ID | M | | | | – | |
| >>>Packet Duplication Indicator | | | ENUMERATED (enabled, disabled) | Indicates whether packet duplication is enabled. | | |
| [...] | | | | | | |

(b-1) XnAP – S-NODE MODIFICATION REQUEST message (Alt.1)

| IE/Group Name | Presence | Range | IE type and referemce | Semantics description | Criticality | Assigned Criticality |
|---|---|---|---|---|---|---|
| Message Type | M | | 9.2.13 | | YES | reject |
| [...] | | | | | | |
| DRB to Be Setup List | | 1 | | | YES | reject |
| >DRB to Be Setup Item IEs | | 1 .. <maxnoofDRBs> | | | EACH | reject |
| >>DRB ID | M | | | | – | |
| >>DC Packet Duplication Indicator | | | ENUMERATED (enabled, disabled) | Indicates whether DC-based packet duplication is enabled. | – | |
| >>CA Packet Duplication Indicator | | | ENUMERATED (enabled, disabled) | Indicates whether CA-packet duplicationis enabled. | – | |
| [...] | | | | | | |
| DRB to Be Modified List | | 0..1 | | | YES | reject |
| >DRB to Be Modified Item IEs | | 1 .. <maxnoofDRBs> | | | EACH | reject |
| >>DRB ID | M | | | | – | |
| >>DC Packet Duplication Indicator | | | ENUMERATED (enabled, disabled) | Indicates whether DC-based packet duplication is enabled. | | |
| >>CA Packet Duplication Indicator | | | ENUMERATED (enabled, disabled) | Indicates whether CA-packet duplication is enabled. | | |
| [...] | | | | | | |

(b-2) XnAP – S-NODE MODIFICATION REQUEST message (Alt.2)

FIG. 5C

| IE/Group Name | Presence | Range | IE type and referemce | Semantics description | Criticality | Assigned Criticality |
|---|---|---|---|---|---|---|
| Message Type | M | | 9.2.13 | | YES | reject |
| | | [...] | | | | |
| E-RABs To Be Added List | | 1 | | | YES | reject |
| >E-RABs To Be Added Item | | 1 .. <maxnoof Bearers> | | | EACH | reject |
| >>E-RAB ID | M | | 9.2.23 | | – | |
| >>DRB ID | M | | 9.2.122 | | – | |
| >>Packet Duplication Indicator | | | ENUMERATED (enabled, disabled) | Indicates whether packet duplication is enabled. | – | |
| [...] | | | | | | |

(c-1) X2AP – SGNB ADDITION REQUEST message (Alt.1)

| IE/Group Name | Presence | Range | IE type and referemce | Semantics description | Criticality | Assigned Criticality |
|---|---|---|---|---|---|---|
| Message Type | M | | 9.2.13 | | YES | reject |
| | | [...] | | | | |
| E-RABs To Be Added List | | 1 | | | YES | reject |
| >E-RABs To Be Added Item | | 1 .. <maxnoof Bearers> | | | EACH | reject |
| >>E-RAB ID | M | | 9.2.23 | | – | |
| >>DRB ID | M | | 9.2.122 | | – | |
| >>DC Packet Duplication Indicator | | | ENUMERATED (enabled, disabled) | Indicates whether DC-based packet duplication is enabled. | – | |
| >>CA Packet Duplication Indicator | | | ENUMERATED (enabled, disabled) | Indicates whether CA-packet duplication is enabled. | – | |
| [...] | | | | | | |

(c-2) X2AP – SGNB ADDITION REQUEST message (Alt.2)

FIG. 5D

| IE/Group Name | Presence | Range | IE type and referemce | Semantics description | Criticality | Assigned Criticality |
|---|---|---|---|---|---|---|
| Message Type | M | | 9.2.13 | | YES | reject |
| [...] | | | | | | |
| E-RABs To Be Added List | | 1 | | | YES | reject |
| >E-RABs To Be Added Item | | 1 .. <maxnoof Bearers> | | | EACH | reject |
| >>E-RAB ID | M | | 9.2.23 | | | |
| >>DRB ID | M | | 9.2.122 | | – | |
| >>Packet Duplication Indicator | | | ENUMERATED (enabled, disabled) | Indicates whether packet duplication is enabled. | – | |
| [...] | | | | | | |
| E-RABs To Be Modified List | | 0..1 | | | – | |
| >E-RABs To Be Modified Item | | 1 .. <maxnoof Bearers> | | | EACH | ignore |
| >>E-RAB ID | M | | 9.2.23 | | – | |
| >>Packet Duplication Indicator | | | ENUMERATED (enabled, disabled) | Indicates whether packet duplication is enabled. | – | |
| [...] | | | | | | |

(d-1) X2AP – SGNB MODIFICATION REQUEST message (Alt.1)

| IE/Group Name | Presence | Range | IE type and referemce | Semantics description | Criticality | Assigned Criticality |
|---|---|---|---|---|---|---|
| Message Type | M | | 9.2.13 | | YES | reject |
| [...] | | | | | | |
| E-RABs To Be Added List | | 1 | | | YES | reject |
| >E-RABs To Be Added Item | | 1 .. <maxnoof Bearers> | | | EACH | reject |
| >>E-RAB ID | M | | 9.2.23 | | – | |
| >>DRB ID | M | | 9.2.122 | | – | |
| >>DC Packet Duplication Indicator | | | ENUMERATED (enabled, disabled) | Indicates whether DC-based packet duplication is enabled. | – | |
| >>CA Packet Duplication Indicator | | | ENUMERATED (enabled, disabled) | Indicates whether CA-packet duplication is enabled. | | |
| [...] | | | | | | |
| E-RABs To Be Modified List | | 0..1 | | | – | |
| >E-RABs To Be Modified Item | | 1 .. <maxnoof Bearers> | | | EACH | ignore |
| >>E-RAB ID | M | | 9.2.23 | | – | |
| >>DC Packet Duplication Indicator | | | ENUMERATED (enabled, disabled) | Indicates whether DC-based packet duplication is enabled. | | |
| >>CA Packet Duplication Indicator | | | ENUMERATED (enabled, disabled) | Indicates whether CA-packet duplication is enabled. | | |
| [...] | | | | | | |

(d-2) X2AP – SGNB MODIFICATION REQUEST message (Alt.2)

FIG. 6A

| IE/Group Name | Presence | Range | IE type and referemce | Semantics description | Criticality | Assigned Criticality |
|---|---|---|---|---|---|---|
| Message Type | M | | 9.2.13 | | YES | reject |
| | | [...] | | | | |
| DRB to Be Setup List | | 1 | | | YES | reject |
| >DRB to Be Setup Item IEs | | 1 .. <maxnoofDRB> | | | EACH | reject |
| >>DRB ID | M | | | | – | |
| >>Packet Duplication Indicator | | | ENUMERATED (enabled, disabled) | Indicates whether packet duplication is enabled. | – | |
| >>MACE CE duplication Indication position | | | INTEGER | | | |
| | | [...] | | | | |

(a-1) F1AP – UE CONTEXT SETUP REQUEST message (Alt.1)

| IE/Group Name | Presence | Range | IE type and referemce | Semantics description | Criticality | Assigned Criticality |
|---|---|---|---|---|---|---|
| Message Type | M | | 9.2.13 | | YES | reject |
| | | [...] | | | | |
| DRB to Be Setup List | | 1 | | | YES | reject |
| >DRB to Be Setup Item IEs | | 1 .. <maxnoofDRBs> | | | EACH | reject |
| >>DRB ID | M | | | | – | |
| >>DC Packet Duplication Indicator | | | ENUMERATED (enabled, disabled) | Indicates whether DC-based packet duplication is enabled. | – | |
| >>CA Packet Duplication Indicator | | | ENUMERATED (enabled, disabled) | Indicates whether CA-packet duplication is enabled. | – | |
| >>MACE CE duplication Indication position | | | INTEGER | | | |
| | | [...] | | | | |

(a-2) F1AP – UE CONTEXT SETUP REQUEST message (Alt.2)

FIG. 6B

| IE/Group Name | Presence | Range | IE type and referemce | Semantics description | Criticality | Assigned Criticality |
|---|---|---|---|---|---|---|
| Message Type | M | | | | YES | reject |
| [...] | | | | | | |
| DRB to Be Setup List | | 1 | | | YES | reject |
| >DRB to Be Setup Item IEs | | 1 .. <maxnoofDRBs> | | | EACH | reject |
| >>DRB ID | M | | | | – | |
| >> Packet Duplication Indicator | | | ENUMERATED (enabled, disabled) | Indicates whether packet duplication is enabled. | – | |
| >>MACE CE position | | | ITEGER | | | |
| [...] | | | | | | |
| DRB to Be Modified List | | 0..1 | | | YES | reject |
| >DRB to Be Modified Item IEs | | 1 .. <maxnoofDRBs> | | | EACH | reject |
| >>DRB ID | M | | | | – | |
| >>> Packet Duplication Indicator | | | ENUMERATED (enabled, disabled) | Indicates whether packet duplication is enabled. | | |
| >>MACE CE duplication Indication position | | | INTEGER | | | |
| [...] | | | | | | |

(b-1) F1AP – UE CONTEXT MODIFICATION REQUEST message (Alt.1)

| IE/Group Name | Presence | Range | IE type and referemce | Semantics description | Criticality | Assigned Criticality |
|---|---|---|---|---|---|---|
| Message Type | M | | | | YES | reject |
| [...] | | | | | | |
| DRB to Be Setup List | | 1 | | | YES | reject |
| >DRB to Be Setup Item IEs | | 1 .. <maxnoofDRBs> | | | EACH | reject |
| >>DRB ID | M | | | | – | |
| >>DC Packet Duplication Indicator | | | ENUMERATED (enabled, disabled) | Indicates whether DC-based packet duplication is enabled. | – | |
| >>CA Packet Duplication Indicator | | | ENUMERATED (enabled, disabled) | Indicates whether CA-packet duplication is enabled. | | |
| >>MACE CE position | | | INTEGER | | | |
| [...] | | | | | | |
| DRB to Be Modified List | | 0..1 | | | YES | reject |
| >DRB to Be Modified Item IEs | | 1 .. <maxnoofDRBs> | | | EACH | reject |
| >>DRB ID | M | | | | – | |
| >>DC Packet Duplication Indicator | | | ENUMERATED (enabled, disabled) | Indicates whether DC-based packet duplication is enabled. | | |
| >>CA Packet Duplication Indicator | | | ENUMERATED (enabled, disabled) | Indicates whether CA-packet duplication is enabled. | | |
| >>MACE CE duplication Indication position | | | INTEGER | | | |
| [...] | | | | | | |

(b-2) F1AP – UE CONTEXT MODIFICATION REQUEST message (Alt.2)

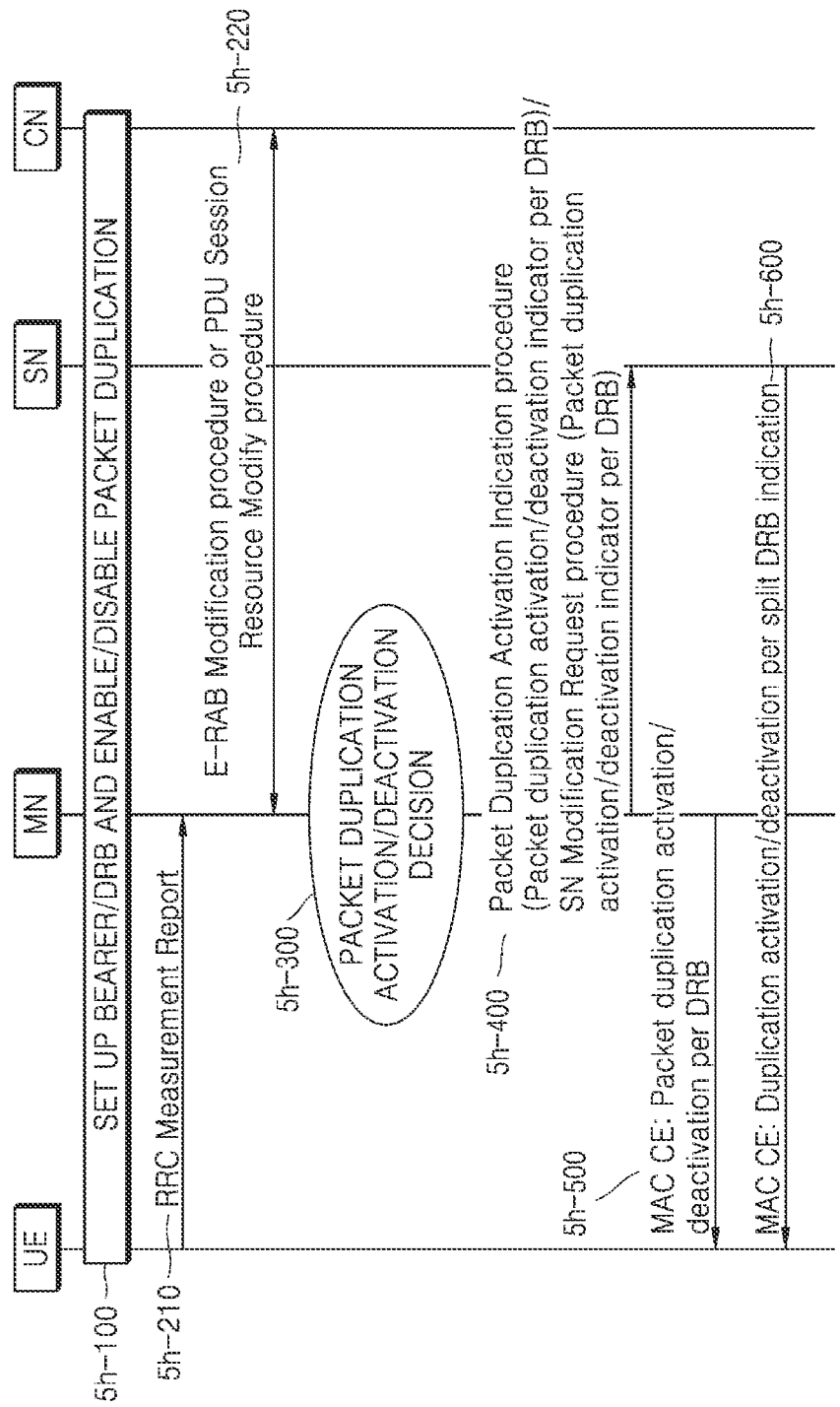

FIG. 13

| IE/Group Name | Presence | Range | IE type and referemce | Semantics description | Criticality | Assigned Criticality |
|---|---|---|---|---|---|---|
| Message Type | M | | | | YES | reject |
| DRB to Be Packet Duplication Indication List | | 1 | | | YES | |
| >DRB to Be Packet Duplication Indication Item IEs | | 1 .. <maxnoofDRBs> | | | EACH | reject |
| >>DRB ID | M | | | | – | |
| >>Packet Duplication Activation Indication | | | ENUMERATED (Activated, Deactivated) | | – | |

(a) X2AP/XnAP – PACKET DUPLICATION ACTIVATION INDICATIOB message

| IE/Group Name | Presence | Range | IE type and referemce | Semantics description | Criticality | Assigned Criticality |
|---|---|---|---|---|---|---|
| Message Type | M | | 9.2.13 | | YES | reject |
| [...] | | | | | | |
| DRB to Be Modified List | | 0.1 | | | YES | reject |
| >DRB to Be Modified Item IEs | | 1 .. <maxnoofDRBs> | | | EACH | reject |
| >>DRB ID | M | | | | – | |
| >>Packet Duplication Activation Indication | | | ENUMERATED (Activated, Deactivated) | | – | |
| [...] | | | | | | |

(a) XnAP – S-NODE MODIFICATION REQUEST message

| IE/Group Name | Presence | Range | IE type and referemce | Semantics description | Criticality | Assigned Criticality |
|---|---|---|---|---|---|---|
| Message Type | M | | 9.2.13 | | YES | reject |
| [...] | | | | | | |
| E-RABs To Be Modified List | | 0.1 | | | – | |
| >E-RABs To Be Modified Item | | 1 .. <maxnoof Bearers> | | | EACH | ignore |
| >>E-RAB ID | M | | 9.2.23 | | – | |
| >>Packet Duplication Activation Indication | | | ENUMERATED (Activated, Deactivated) | | – | |
| [...] | | | | | | |

(a) X2AP-SGNB MODIFICATION REQUEST message

FIG. 14

| IE/Group Name | Presence | Range | IE type and referemce | Semantics description | Criticality | Assigned Criticality |
|---|---|---|---|---|---|---|
| Message Type | M | | 9.2.13 | | YES | reject |
| | | [...] | | | | |
| DRB to Be Modified List | | 0..1 | | | YES | reject |
| >DRB to Be Modified Item IEs | | 1 .. <maxnoofDRBs> | | | EACH | reject |
| >>DRB ID | M | | | | – | |
| >>Packet Duplication Activation Indication | | | ENUMERATED (Activated, Deactivated) | | – | |
| | | [...] | | | | |

FIG. 20

| Bits | | | | | | | | Number of Octers |
|---|---|---|---|---|---|---|---|---|
| 7 | 6 | 5 | 4 | 3 | 2 | 1 | 0 | |
| PDU Type (=0) | | | | Spare | DL Discard Blocks | DL Flush | Report polling | 1 |
| Spare | | | | | Duplication Indicator | Assistance Info. Report Polling Flag | Retransmission flag | 1 |
| NR-U Sequence Number | | | | | | | | 3 |
| DL discard NR PDCP PDU SN | | | | | | | | 0 or 3 |
| DL discard Number of blocks | | | | | | | | 0 or 3 |
| DL discard NR PDCP PDU SN start (first block) | | | | | | | | 0 or 3 |
| Discard Block size (first block) | | | | | | | | 0 or 3 |
| ⋮ | | | | | | | | |
| DL discard NR PDCP PDU SN start (last block) | | | | | | | | 0 or 3 |
| Discard Block size (last block) | | | | | | | | 0 or 1 |
| Packet Duplication Activation/Deactivation | | | | | | | | 0 or 1 |
| Padding | | | | | | | | 0-3 |

DL USER DATA (PDU Type 0) Format

FIG. 21

| Bits | | | | | | | | Number of Octers |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind | Highest Delivered NR PDCP SN Ind | Final Frame Ind. | Lost Packet Report | 1 |
| Spare | | | | Radio Quality Indicator | Datarate Ind. | Highest Retransmitted NR PDCP SN Ind | Highest Delivered Retransmitted NR PDCP SN Ind | Cause Report | 1 |
| Desired buffer size for the data radio bearer | | | | | | | | 4 |
| Desired Data Rate | | | | | | | | 0 or 4 |
| Number of lost NR-U Sequence Number ranges reported | | | | | | | | 0 or 1 |
| Start of lost NR-U Sequence Number range | | | | | | | | 0 or (6* Number of reported lost NR-U SN ranges) |
| End of lost NR-U Sequence Number range | | | | | | | | |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Highest successfully delivered retransmitted NR PDCP Sequence Number | | | | | | | | 0 or 3 |
| Highest retransmitted NR PDCP Sequence Number | | | | | | | | 0 or 3 |
| Radio Quality | | | | | | | | 0 or 4 |
| Padding | | | | | | | | 0-3 |

DL DATA DELIVERY STATUS (PDU Type 1) Format

METHOD AND APPARATUS FOR SYNCHRONIZING PACKET DUPLICATION OPERATION BETWEEN BASE STATION NODES IN MOBILE COMMUNICATION SYSTEM

PRIORITY

This application is a Continuation Application of U.S. application Ser. No. 16/972,322, filed in the U.S. Patent and Trademark Office on Dec. 4, 2020, which is a National Phase Entry of PCT International Application No. PCT/KR2019/007545, which was filed on Jun. 21, 2019, and claims priority to Korean Patent Application Nos. 10-2018-0071715 and 10-2018-0163321, which were filed in the Korean Intellectual Property Office on Jun. 21, 2018 and Dec. 17, 2018, respectively, the content of each of which is incorporated herein by reference.

FIELD

The present disclosure relates to a mobile communication system, and more specifically, to a method and apparatus for synchronizing packet duplication between base station nodes in a base station for smoothly providing a service.

BACKGROUND

To meet the increasing demand for wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long-term evolution (post-LTE)' systems. To achieve high data transfer rates, implementation of 5G communication systems in an ultra-high frequency (mmWave) band (e.g., a 60-GHz band) is being considered. To reduce path loss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks, for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and reception interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network whereby humans generate and consume information to the Internet-of-things (IoT) whereby distributed elements such as objects exchange information with each other to process the information. Internet-of-Everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In an IoT environment, intelligent Internet technology (IT) services may be provided to collect and analyze data obtained from connected objects to generate new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies such as sensor networks, M2M communication, MTC, or the like are being implemented by using 5G communication technologies such as beamforming, MIMO, array antennas, or the like. Application of the cloud RAN as the above-described big data processing technology may be an example of convergence of 5G communication technology and IoT technology.

SUMMARY

The disclosure relates to a method and apparatus for synchronizing packet duplication between base station nodes in a mobile communication system. In an embodiment of the disclosure, a first base station may transmit information indicating whether packet duplication is activated for each data radio bearer (DRB) to a second base station and transmit a medium access control (MAC) control element (CE) including the information indicating whether packet duplication is activated to a user equipment (UE).

According to an embodiment, a method of a first base station is provided for activating or deactivating packet duplication in a wireless communication system. A central unit (CU) of the first base station transmits, to a distributed unit (DU) of the first base station, via an F1 interface, information to activate or deactivate a dual connectivity (DC) based packet duplication for a DRB. The information is transmitted to a second base station. A MAC CE indicating whether to activate or deactivate packet duplication for the DRB, based on the information, is transmitted to a UE.

According to an embodiment, a method of a second base station is provided activating or deactivating packet duplication in a wireless communication system. Information to activate or deactivate a DC based packet duplication for a DRB, is received from a first base station. A CU of the second base station transmits the information to a DU of the second base station, via an F1 interface. A MAC CE indicating whether to activate or deactivate packet duplication for the DRB, based on the information, is transmitted to a UE.

According to an embodiment, a first base station is provided for activating or deactivating packet duplication in a wireless communication system. The first base station includes a transceiver and at least one processor connected to the transceiver. The at least one processor is configured to transmit, by a CU of the first base station, to a DU of the first base station, information to activate or deactivate a DC based packet duplication for a DRB. The at least one processor is also configured to transmit the information to a second base station, and transmit, to a UE, a MAC CE indicating whether to activate or deactivate packet duplication for the DRB, based on the information.

According to an embodiment, a second base station is provided for activating or deactivating packet duplication in a wireless communication system. The second base station includes a transceiver and at least one processor connected to the transceiver. The at least one processor is configured to receive, from a first base station, information to activate or deactivate a DC based packet duplication for a DRB. The at least one processor is also configured to transmit the information, by a CU of the second base station, to a DU of the second base station, via an F1 interface. The at least one processor is further configured to transmit, to a UE, a MAC CE indicating whether to activate or deactivate packet duplication for the DRB, based on the information.

BRIEF DESCRIPTION OF DRAWINGS

FIGS. 5A to 5D are diagrams illustrating examples of an X2/Xn message used for a packet duplication configuration synchronization procedure between two base station nodes, according to an embodiment of the disclosure.

FIGS. 6A and 6B are diagrams illustrating examples of an F1 message used for a packet duplication configuration synchronization procedure in a base station architecture divided into a CU and a DU, according to an embodiment of the disclosure.

FIG. 8A is a diagram for explaining a procedure of determining, by a control plane (CP) of a master node (MN) base station, whether to activate/deactivate packet duplication and performing synchronization under an integrated base station architecture, according to an embodiment of the disclosure.

FIG. 13 is a diagram illustrating an example of an X2/Xn message for transmitting packet duplication activation/deactivation indication information, according to an embodiment of the disclosure.

FIG. 14 is a diagram illustrating an example of an F1 message for transmitting packet duplication activation/deactivation indication information, according to an embodiment of the disclosure.

FIG. 20 is a diagram illustrating an example of a downlink data delivery status message, which is a UP message used for determining whether to activate/deactivate packet duplication and for synchronization between nodes, according to an embodiment of the disclosure.

FIG. 21 is a diagram illustrating an example of a downlink data message, which is a UP message used for synchronization between nodes in which packet duplication is to be activated/deactivated, according to an embodiment of the disclosure.

DETAILED DESCRIPTION

Figure 1:
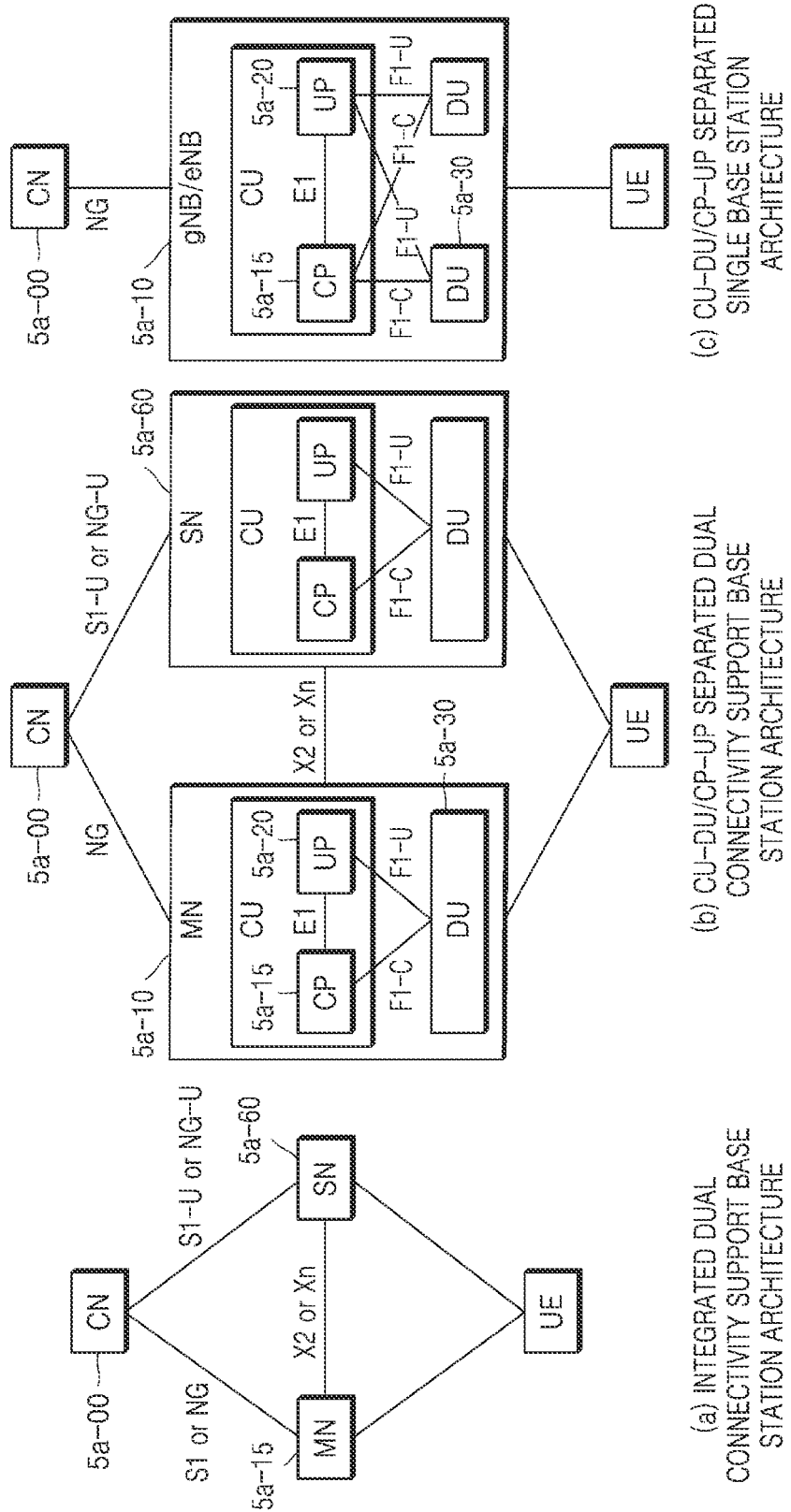
FIG. 1 is a diagram illustrating a configuration of a next-generation mobile communication system.

When embodiments of the disclosure are described herein, a description of techniques which are well known in the technical field to which the disclosure pertains and are not directly related to the disclosure will be omitted. This is to more clearly convey the gist of the disclosure by omitting unnecessary description.

For the same reason, some components are exaggerated, omitted, or schematically illustrated in the accompanying drawings. The size of each component does not entirely reflect the actual size thereof. The same reference numerals are allocated to the same or corresponding elements in each drawing.

Advantages and features of the disclosure and methods of achieving them will be apparent from embodiments of the disclosure described in detail below, in conjunction with the accompanying drawings. However, the disclosure is not limited to the embodiments of the disclosure below and may be embodied in many different forms. Rather, the embodiments of the disclosure are provided so that this disclosure will be thorough and complete and will fully convey the concept of the disclosure to those of ordinary skill in the art. The disclosure should be defined by the scope of the claims. The same reference numerals refer to the same components throughout the specification.

In this case, it will be understood that each block of process flowcharts and combinations of the flowcharts may be performed by computer program instructions. The computer program instructions may be installed in a processor of a general-purpose computer, special-purpose computer, or other programmable data processing equipment, so that means to perform functions described in blocks of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block (or blocks) of each flowchart, may be produced by the instructions stored in the computer usable or readable memory. Because the computer program instructions may be stored in a computer or other programmable data processing equipment, the functions of the blocks of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments of the disclosure, the functions described in the blocks may be performed in an order different from that described herein. For example, two blocks illustrated consecutively may be performed substantially simultaneously or performed in a reverse order according to functions corresponding thereto in some cases.

In this case, the term 'unit' used in embodiments of the disclosure set forth herein represents software or hardware components such as FPGA or ASIC, and a '~ unit' performs certain roles. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card. In embodiments of the disclosure, a "unit" may include one or more processors.

FIG. 1 is a diagram illustrating a configuration of a next-generation mobile communication system.

Referring to FIG. 1, a master node (MN) and a secondary node (SN) may be each a Long-Term Evolution Evolved Node B (LTE eNB) or a New Radio Base Station (NR gNB) connected to a mobile communication core network (CN) such as an Evolved Packet Core (EPC) or a 5G Core Network (5GC) or may be a mobile communication base station such as a WiFi Access Point (AP) irrelevant to Radio Access Technology (RAT).

In FIG. 1, (a) refers to a configuration in which user data may be transmitted by simultaneously connecting two integrated base stations to one user equipment (UE), and the base stations may be connected to each other through an inter-base-station interface such as X2 or Xn interface and may be connected to a CN through a base-station-to-core-network interface such as an S1 or NG interface.

In FIG. 1, (b) refers to a base station architecture configured by separating one base station into a central unit (CU) and a distributed unit (DU) and separating the CU into a CU control plane (CU-CP) and a CU user plane (CU-UP), in which two base stations may be simultaneously connected to one UE to transmit user data. Functions of the base station may be divided and supported by the CU and the DU.

For example, the CU may support a radio resource control (RRC)/packet data convergence protocol (PDCP) layer, the DU may support a radio link control (RLC)/media access control (MAC)/physical (PHY)/radio frequency (FR) layer, and the CU and the DU may be connected through an F1 interface. The CU may be separated into a CU-CP and a CU-UP. For example, the CU-CP may support RRC/PDCP layer (for RRC), and the CU-UP may support a PDCP layer (for transmission of user data). Here, the MN or SN may be configured as an integrated base station such as the configuration (a) rather than a separated base station, so that the integrated base station and the separate base station may be connected. In the base station architecture (b), there may be several DUs in one base station (MN or SN).

In FIG. 1, (c) refers to a base station architecture configured by separating a base station into a CU and a DU and separating the CU into a CU-CP and a CU-UP, similar to the base station architecture (b). A packet duplication synchronization method described herein may be performed within one base station such as the base station architecture (c).

The disclosure provides a method of synchronizing a configuration as to whether to support packet duplication for each bearer between nodes and synchronizing a bit position for each Data Radio Bearer (DRB) in a Medium Access Control Control Element (MAC CE) transmitted to activate/deactivate packet duplication, when packets are duplicated and transmitted using two or more paths to increase the reliability of packet transmission in a radio section when a bearer is set up for transmission of user data.

Figure 2:
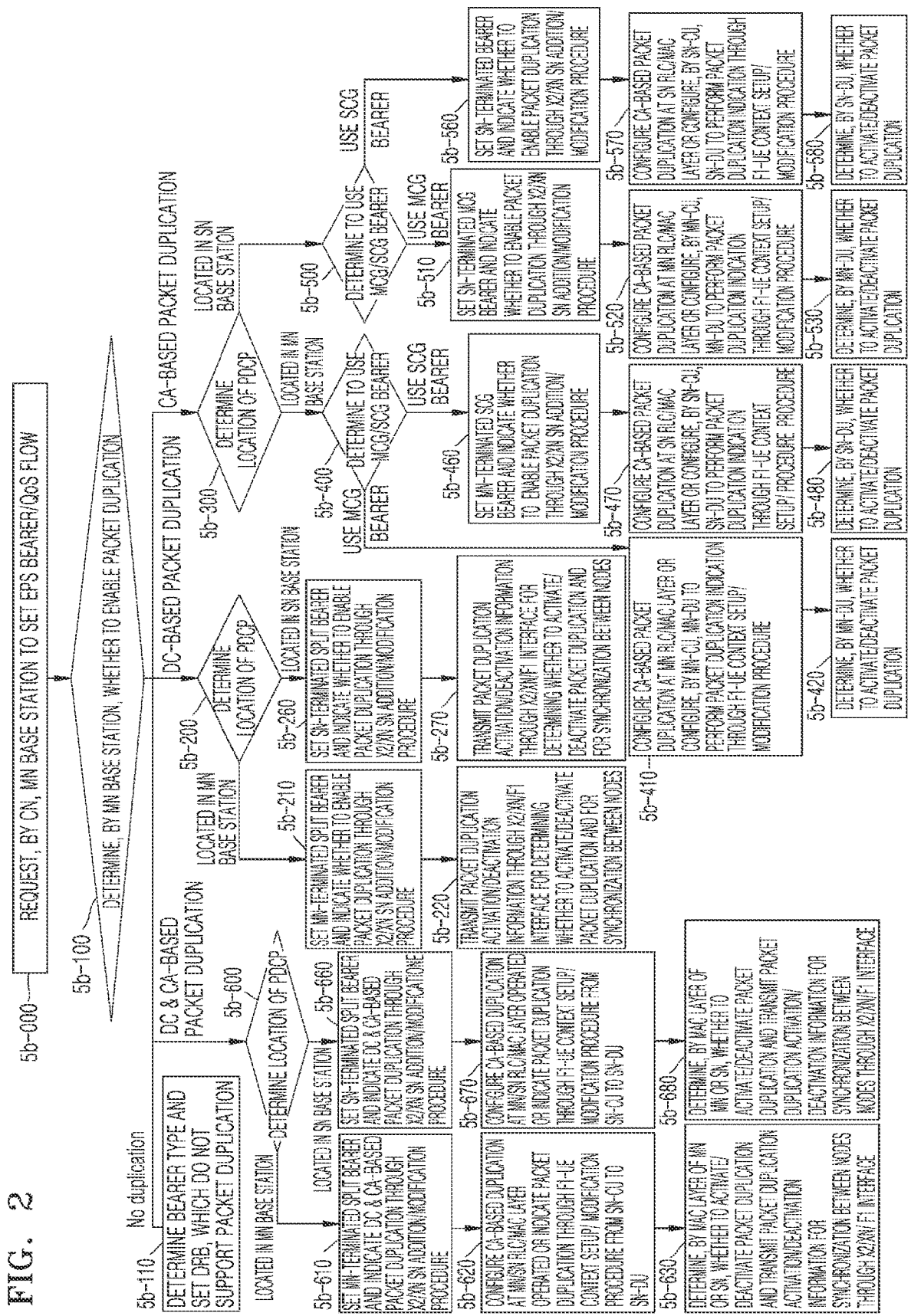
FIG. 2 is a diagram for explaining a method of configuring packet duplication and determining whether to activate/deactivate packet duplication when a bearer is set up, according to an embodiment of the disclosure.

FIG. 2 is a diagram for explaining a method of configuring packet duplication and determining whether to activate/deactivate packet duplication when a bearer is set up, according to an embodiment of the disclosure.

A procedure of determining packet duplication and transmission using two or more paths and performing signaling to increase the reliability of packet transmission in a radio section when a base station sets up a bearer for transmission of user data will be described with reference to FIG. 2 below.

Packet duplication and transmission technologies include DC packet duplication for packet duplication and transmission using DC technology, and Carrier Aggregation (CA) packet duplication for packet duplication and transmission using CA technology.

Synchronization of packet duplication between base station nodes and synchronization of a bit position for each DRB in an MAC CE for controlling activation/deactivation of packet duplication between an IE and a base station may be supported through the procedure of FIG. 2.

In operation 5b-000, when a CN transmits a request to set a bearer or Quality-of-Service (QoS) flow to an MN, the MN determines whether to enable packet duplication for a corresponding bearer service according to bearer or QoS flow support information (e.g., QoS information such as a 5QI) provided from the CN. In this case, CA technology-based packet duplication or DC technology-based packet duplication may be determined to be enabled when the MN determines to enable packet duplication, and a general type of bearer is determined and a DRB is set when the MN determines to disable packet duplication as in operation 5b-110.

In operation 5b-200, when in operation 5b-100, the MN determines to enable DC-based packet duplication, the MN may determine a position of a Packet Data Convergence Protocol (PDCP) for serving the bearer.

In operation 5b-210, when in operation 5b-200, the MN determines to use a PDCP thereof, the MN and an SN may set an MN-terminated split bearer and indicate whether to enable packet duplication while performing an SN addition or modification procedure using an X2/Xn interface, so that a position at which a packet duplication activation/deactivation indication is to be transmitted for each DRB in an MAC CE may be the same between a UE and a base station.

Thereafter, in operation 5b-220, the MN or SN may determine whether to activate/deactivate packet duplication, and the base station (MN or SN) that determines whether to activate/deactivate packet duplication may transmit information for determining whether to activate/deactivate packet duplication with respect to a node related thereto to another base station (the MN, the SN, a DU in the SN or the like), which has not yet to determine whether to activate/deactivate packet duplication, so that whether to activate/deactivate packet duplication may be determined equally in the DRBs of the MAC CE to be transmitted to the UE.

In operation 5b-260, when in operation 5b-200, the MN determines to use a PDCP of the SN, the MN and an SN may set an SN-terminated split bearer and indicate whether to enable packet duplication while performing the SN addition or modification procedure using the X2/Xn interface, so that a position at which a packet duplication activation/deactivation indication is to be transmitted for each DRB in the MAC CE may be the same between the UE and the base station.

Thereafter, in operation 5b-270, the MN or SN may determine whether to activate/deactivate packet duplication and transmit information for determining whether to activate/deactivate packet duplication with respect to a relevant node, so that whether to activate/deactivate packet duplication may be determined equally in the DRBs of the MAC CE to be transmitted to the UE.

In operation 5b-300, when in operation 5b-100, the MN determines to enable CA-based packet duplication, the MN may determine a position of the PDCP for serving the bearer.

In operation 5b-400, when in operation 5b-300, the MN determines to use the PDCP of the MN, the MN and the SN may determine whether to use a master cell group (MCG) bearer or a secondary cell group (SCG) bearer.

In operation 5b-410, when in operation 5b-400, the MN and SN determine to use the MCG bearer, the MN may configure CA-based packet duplication at an MN RLC/MAC layer with respect to the MCG bearer, and the CU of the MN may configure the DU to set up F1 UE context or perform CA-based packet duplication with respect to the MCG bearer through a modification procedure.

Thereafter, in operation 5b-420, the DU of the MN may determine whether to activate/deactivate CA-based packet duplication with respect to the MCG bearer and transmit a result of the determination to the UE through the MAC CE.

In operation 5b-460, when in operation 5b-400, the MN and the SN determine to use the SCG bearer, the MN or SN may configure to use the MN-terminated SCG bearer and indicate whether to enable packet duplication by using the SN addition or modification procedure of the X2/Xn interface.

In operation 5b-470, the SN may configure CA-based packet duplication at the SN RLC/MAC layer with respect to the SCG bearer or a CU of the SN may configure a DU to perform CA-based packet duplication with respect to the SCG bearer through an F1 UE context setup or modification procedure.

Thereafter, in operation 5b-480, the DU of the SN may determine whether to activate/deactivate CA-based packet duplication with respect to the SCG bearer and transmit a result of the determination to the UE through the MAC CE.

In operation 5b-500, when in operation 5b-300, the MN determines to use the PDCP of the SN base station, the MN and the SN may determine whether to use the MCG bearer or the SCG bearer.

In operation 5b-510, when in operation 5b-500, the MN and SN determine to use the MCG bearer, the MN may configure to use the SN-terminated MCG bearer using the SN addition or modification procedure of the X2/Xn interface and indicate whether to enable packet duplication.

In operation 5b-520, the MN may configure CA-based packet duplication at the MN RLC/MAC layer with respect to the MCG bearer or the CU of the MN may configure the DU to perform CA-based packet duplication with respect to the MCG bearer through an F1 UE context setup or modification procedure.

Thereafter, in operation 5b-530, the DU of the MN may determine whether to activate/deactivate CA-based packet duplication with respect to the MCG bearer and transmit a result of the determination to the UE through the MAC CE.

In operation 5b-560, when in operation 5b-500, the MN and the SN determine to use the SCG bearer, the MN and the SN may configure to use the SN-terminated SCG bearer and indicate whether to enable packet duplication by using the SN addition or modification procedure of the X2/Xn interface.

In operation 5b-570, the SN may configure CA-based packet duplication at the SN RLC/MAC layer with respect to the SCG bearer or the CU of the SN may configure the DU to perform CA-based packet duplication with respect to the SCG bearer through the F1 UE context setup or modification procedure.

Thereafter, in operation 5b-580, the DU of the SN may determine whether to activate/deactivate CA-based packet duplication with respect to the SCG bearer and transmit a result of the determination to the UE through the MAC CE.

In operation 5b-600, when in operation 5b-100, the MN determines to enable DC- and CA-based packet duplication, the MN may determine a position of a PDCP for serving the corresponding bearer.

In operation 5b-610, when in operation 5b-600, the MN determines to use the PDCP thereof, the MN may set the MN-terminated split bearer while performing the SN addition or modification procedure through the X2/Xn interface and indicate whether to enable DC- and CA-based packet duplication to other base stations (SN, the DU in the SN, and the like), so that a position at which a packet duplication activation/deactivation indication is to be transmitted for each DRB in the MAC CE may be the same between the UE and the base station.

Thereafter, in operation 5b-620, according to whether to enable the DC- and CA-based packet duplication indicated in operation 5b-610, the CU of each of the MN and the SN may configure the DU to set up F1 UE context or the DU may configure to perform the DC- and CA-based packet duplication with respect to the MCG or SCG bearer through the modification procedure.

Thereafter, in operation 5b-630, the MN or SN may determine whether to activate/deactivate packet duplication, and the base station (MN or SN) that determines whether to activate/deactivate packet duplication may transmit information for determining whether to activate/deactivate packet duplication as in a node related thereto to another base station (the MN, the SN, the DU in the SN or the like), which has not yet to determine whether to activate/deactivate packet duplication, so that whether to activate/deactivate packet duplication may be determined equally in the DRBs of the MAC CE to be transmitted to the UE.

In operation 5b-660, when in operation 5b-600, the MN determines to use the PDCP of the SN, the MN may configure the SN-terminated split bearer while performing the SN addition or modification procedure through the X2/Xn interface and the SN may indicate whether to enable DC- and CA-based packet duplication in other base stations (MN, the DU in the MN, and the like), so that a position on each DRB in the MAC CE to which a packet duplication activation/deactivation indication is to be transmitted may be the same between the UE and the base station.

Thereafter, in operation 5b-670, according to whether to use the DC- and CA-based packet duplication indicated in operation 5b-660, the CU of each of the MN and the SN may configure the DU to perform F1 UE context setup or the DU may configure to perform the DC- and CA-based packet duplication with respect to the MCG or SCG bearer through the modification procedure.

Thereafter, in operation 5b-680, the MN or SN may determine whether to activate/deactivate packet duplication, and the base station (MN or SN) that determines whether to activate/deactivate packet duplication may transmit information for determining whether to activate/deactivate packet duplication as in a node related thereto to another base station (the MN, the SN, the DU in the SN or the like), which has not yet to determine whether to activate/deactivate packet duplication, so that whether to activate/deactivate packet duplication may be determined equally in the DRBs of the MAC CE to be transmitted to the UE.

Figure 3A:
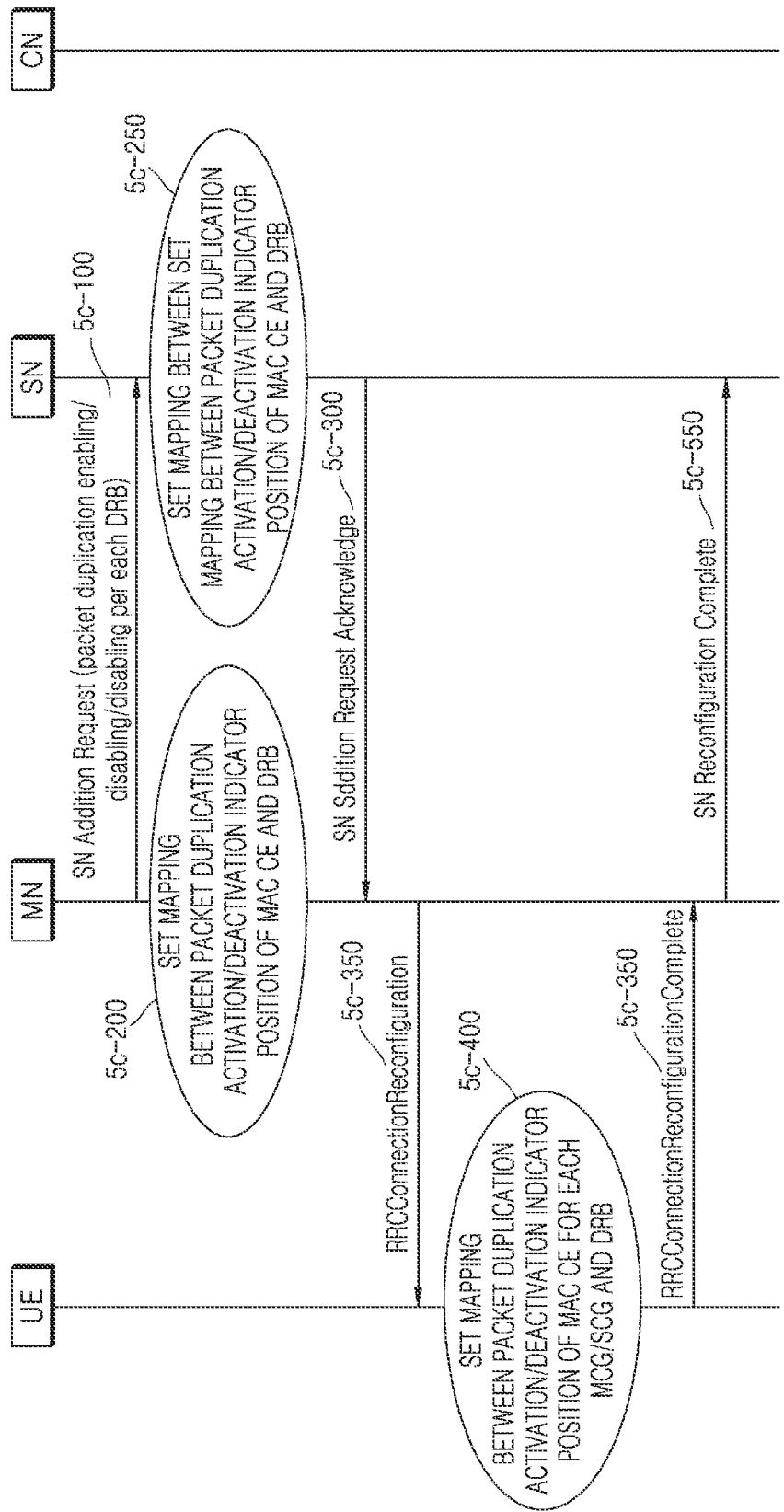
FIGS. 3A and 3B are diagrams for explaining a packet duplication configuration synchronization procedure between two base station nodes, according to an embodiment of the disclosure.
Figure 3B:
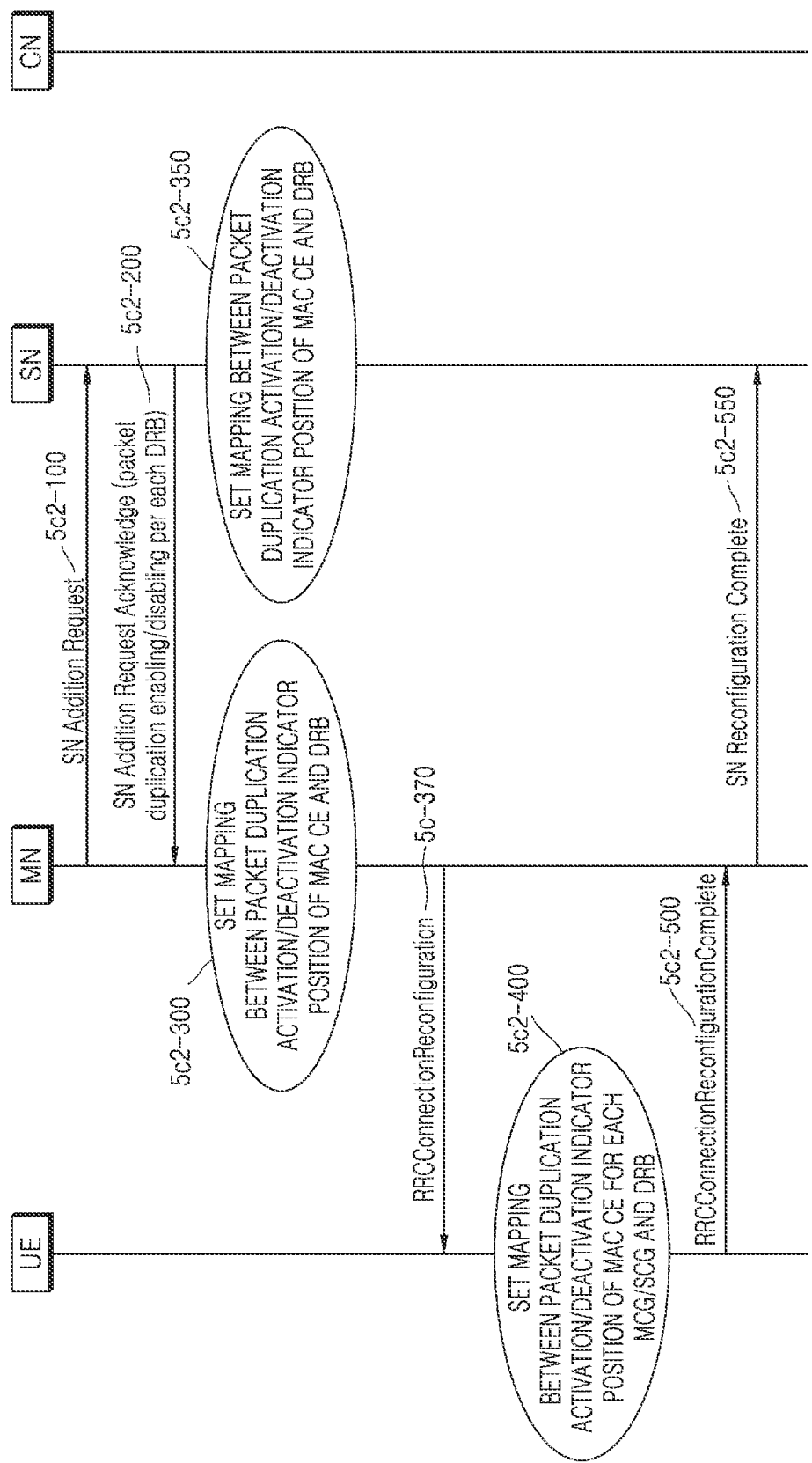

FIGS. 3A and 3B are diagrams for explaining a packet duplication configuration synchronization procedure between two base station nodes according to an embodiment of the disclosure.

A call flow procedure of supporting synchronization as to whether to support packet duplication for each of bearers of two base-station nodes connected through an X2 or Xn interface and synchronization of a bit position for each DRB of an MAC CE for controlling activation/deactivation of packet duplication between a UE and a base station will be described with reference to FIG. 3A below.

In operation 5c-100, an MN may indicate whether to enable packet duplication for each DRB while performing bearer setup through an SN addition request (or SN modification request) message.

In operation 5c-200, the MN may set a packet duplication activation/deactivation indicator position of an MAC CE according to a DRB using packet duplication among DRBs transmitted through an MCG of the MN.

In operation 5c-250, an SN may set a packet duplication activation/deactivation indicator position of an MAC CE according to a DRB using packet duplication among DRBs transmitted through an SCG of the SN, based on bear information configured by the MN.

In operation 5c-300, the SN may respond to the MN with an SN addition request acknowledgment (or SN modification request acknowledgment). In operation 5c-350, the MN may transmit configured bearer information in an RRC connection reconfiguration message to a UE to configure a bearer of the UE.

In operation 5c-400, the UE may set a packet duplication activation/deactivation indicator position in an MAC CE according to a DBR using packet duplication among DBRs of the MAC CE to be used for MAC of an MCG and an SCG, based on bearer setup information (e.g., the MCG, the SCG, and information as to whether a split bearer is to be used) included in the RRC connection reconfiguration message and whether to enable packet duplication for each bearer.

In operation 5c-500, the UE may respond to a base station by transmitting an RRC connection reconfiguration complete message, and the MN may inform the SN that the RRC reconfiguration of the UE is completed.

A call flow procedure for supporting synchronization as to whether to support packet duplication for SN terminated bearers of two base-station nodes connected through an X2 or Xn interface and synchronization of a bit position for each DRB of an MAC CE for controlling activation/deactivation of packet duplication between a UE and a base station will be described with reference to FIG. 3B below.

In operation 5c2-100, an MN may perform an SN-terminated bearer setup through an SN addition request (or SN modification request) message. An SN may determine whether to enable packet duplication for each DRB while setting the SN-terminated bearer. In operation 5c2-200, responds to the MN with an SN addition request acknowledgment (or an SN modification request acknowledgment) to indicate whether to enable packet duplication for each DRB.

In operation 5c2-300, the MN may set a packet duplication activation/deactivation indicator position of an MAC CE according to a DRB using packet duplication among DRBs transmitted through an MCG of the MN, based on information configured by the SN.

In operation 5c2-350, the SN may set a packet duplication activation/deactivation indicator position of the MAC CE according to a DRB using packet duplication among DRBs transmitted through an SCG of the SN.

In operation 5c2-370, the MN may set a bearer of a UE by transmitting configured bearer information in an RRC connection reconfiguration message to the UE, based on information included in an SN addition request acknowledgment (or SN modification request acknowledgment) message received from the SN in operation 5c2-200.

In operation 5c2-400, the UE may set a packet duplication activation/deactivation indicator position in an MAC CE according to a DBR using packet duplication among DBRs of the MAC CE to be used for MAC of an MCG and an SCG, based on bearer setup information (e.g., the MCG, the SCG, and information as to whether a split bearer is to be used) included in the RRC connection reconfiguration message and whether to enable packet duplication for each bearer.

In operation 5c2-500, the UE may respond to a base station by transmitting an RRC connection reconfiguration complete message. In operation 5C2-550, the MN may inform the SN that the RRC reconfiguration of the UE is completed.

Figure 4:
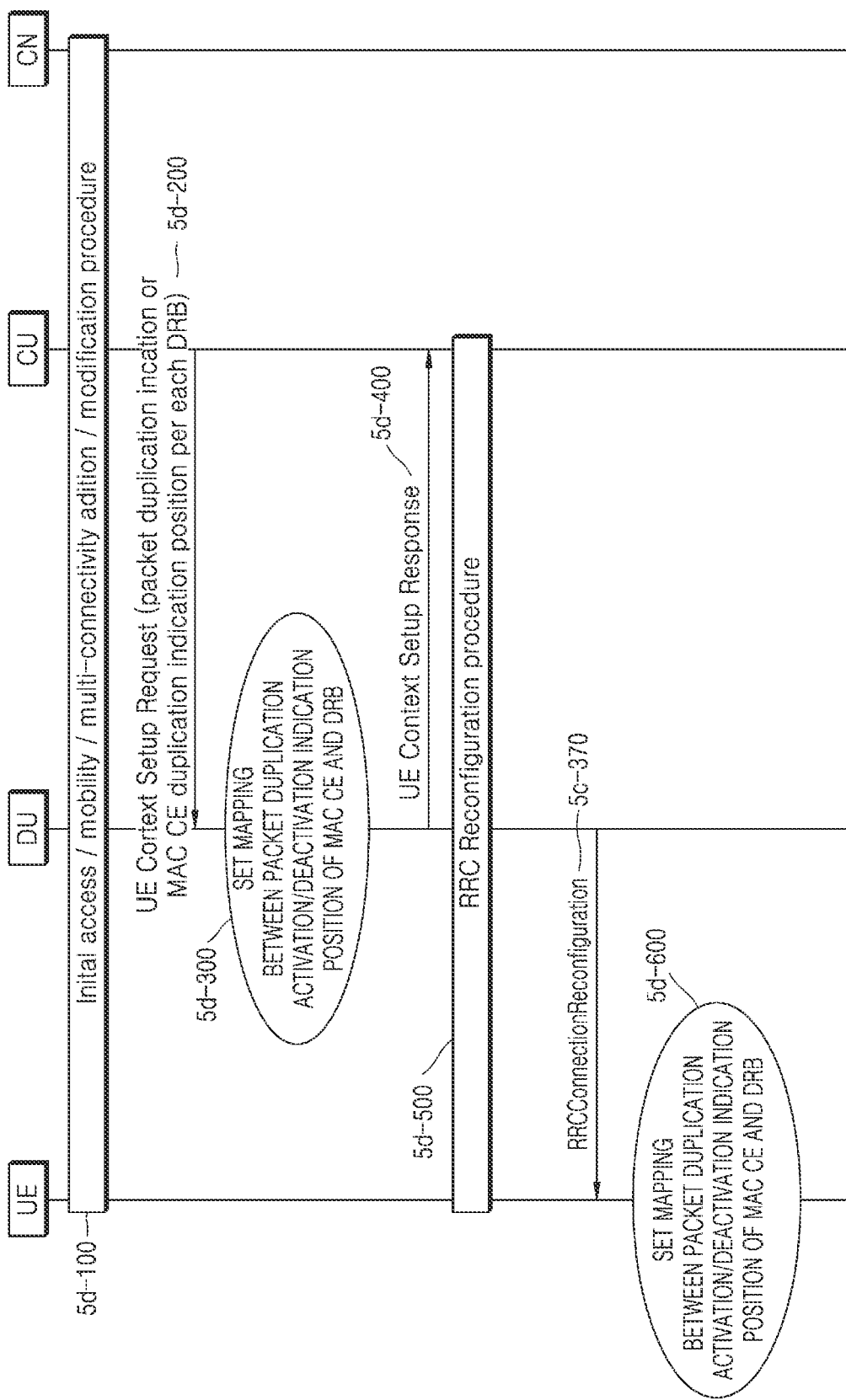
FIG. 4 is a diagram for explaining a packet duplication configuration synchronization procedure in a base station architecture divided into a CU and a DU, according to an embodiment of the disclosure.

FIG. 4 is a diagram for explaining a packet duplication configuration synchronization procedure in a base station architecture divided into a central unit (CU) and a distributed unit (DU), according to an embodiment of the disclosure.

A call flow procedure for supporting from CU to DU synchronization of whether a packet duplication for each bearer is supported and synchronization of a bit position for each DRB in an MAC CE for controlling packet duplication activation/deactivation between a UE and a base station, when the base station is divided into the CU and the DU and the CU and the DU are connected through an F1 interface will be described with reference to FIG. 4 below.

In operation 5d-100, the base station may set a bearer and enable packet duplication as illustrated in FIG. 3 or may set a bearer and determine whether to enable packet duplication after an initial access of the UE to the base station.

In operation 5d-200, the CU of the base station may transmit a UE context setup request message or a UE context modification request message to the DU for a bearer setup. This message may include a packet duplication indication to indicate a bearer using packet duplication, and include a transmission position of a MAC CE duplication indication for each bearer.

In operation 5d-300, the DU may set mapping between a position in the MAC CE at which the packet duplication activation/deactivation indication is transmitted and each bearer according to the packet duplication indication information received from the CU.

In operation 5d-400, after setting/modification of UE context including bearer setup is completed, the DU may respond to the CU with a UE context setup response message or a UE context modification response message.

In operation 5d-500, the base station may transmit bearer setup/modification information and information indicating whether to enable packet duplication to the UE through an RRC reconfiguration procedure.

In operation 5d-600, the UE may set a packet duplication activation/deactivation indicator position in the MAC CE according to a DRB using packet duplication among the DRBs of the MAC CE to be used in the UE MAC.

FIGS. 5A to 5D are diagrams illustrating examples of an X2/Xn message used for a packet duplication configuration synchronization procedure between two base station nodes, according to an embodiment of the disclosure.

FIGS. 5A to 5D illustrate messages used in an X2/Xn interface for SN addition/modification for synchronization as to whether to enable packet duplication for each bearer and synchronization of bit positions of DRBs of the MAC CE for controlling packet duplication activation/deactivation between a UE and a base station, together with additionally necessary information element.

The messages of FIGS. 5A to 5D may include a packet duplication indicator IE for each bearer/DRB so that whether to enable or disable packet duplication in each DRB may be indicated between base stations or may include a CA packet duplication indicator IE and a DC packet duplication indicator IE for each bearer/DRB so that whether to enable or disable packet duplication in each DRB may be indicated between base stations. Inter-base-station packet duplication support information may be transmitted in one of the messages of FIG. 5A to 5D or an inter-node RRC message.

FIGS. 6A and 6B are diagrams illustrating examples of an F1 message used for a packet duplication configuration synchronization procedure in a base station architecture divided into a CU and a DU, according to an embodiment of the disclosure.

FIGS. 6A and 6B illustrate messages used in an F1 interface for F1 UE context setup/request for synchronization as to whether to enable packet duplication for each bearer and synchronization of bit positions of DRBs of the MAC CE for controlling activation/deactivation of packet duplication between a UE and a base station, together with additionally necessary information element (IE).

The messages of FIGS. 6A and 6B may include a packet duplication indicator IE for each bearer/DRB so that whether to enable or disable packet duplication in each DRB may be indicated by the CU to the DU or may include a CA packet duplication indicator IE and a DC packet duplication indicator IE for each DRB so that whether to enable or disable packet duplication in each DRB may be indicated by the CU to the DU. Alternatively, the messages of FIGS. 6A and 6B may include information for designating a packet duplication indication position on an MAC CE for each DRB. Packet duplication support information may be transmitted from the CU to the DU by using the message of FIG. 6A or 6B or an inter-node RRC message.

After synchronization of whether to support packet duplication between base-station nodes and a bit position for each DR in the MAC C, packet duplication is actually performed by indicating, by a base station, whether to activate/deactivate packet duplication for each bearer supporting packet duplication to a UE through the MAC CE. When packet duplication is enabled for one UE, packets may be transmitted from two (or two or more) nodes or two (or two or more) frequency carriers and an MAC CE for indicating activation/deactivation of packet duplication may be transmitted by each node or carrier. In this case, information indicating packet duplication activation/deactivation transmitted to the UE by each node or frequency carrier should be the same for each DRB. When different information is transmitted to the UE, an inconsistency in packet duplication between the UE and the base station may occur, thereby causing performance degradation.

There are three methods of determining and indicating whether to activate/deactivate packet duplication between nodes as follows:

1. a method of determining, by a control plane (a CU, a CU-CP/RRC, a base-station controller or the like) of a base station, whether to activate/deactivate packet duplication and transmitting a result of the determination to another node (another base station, a DU of the like)

2. a method of determining, by a user plane (a CU-UP, a PDCP or the like) of the base station whether to activate/deactivate packet duplication and transmitting a result of the determination to another node (a CU-CP, another base station, the DU or the like)

3. a method of determining, by a DU supporting an RLC/MAC/PHY layer operation, whether to activate/deactivate packet duplication and transmitting a result of the determination to another node (the CU-CP, the CU-UP, another base station or the like).

Figure 7:
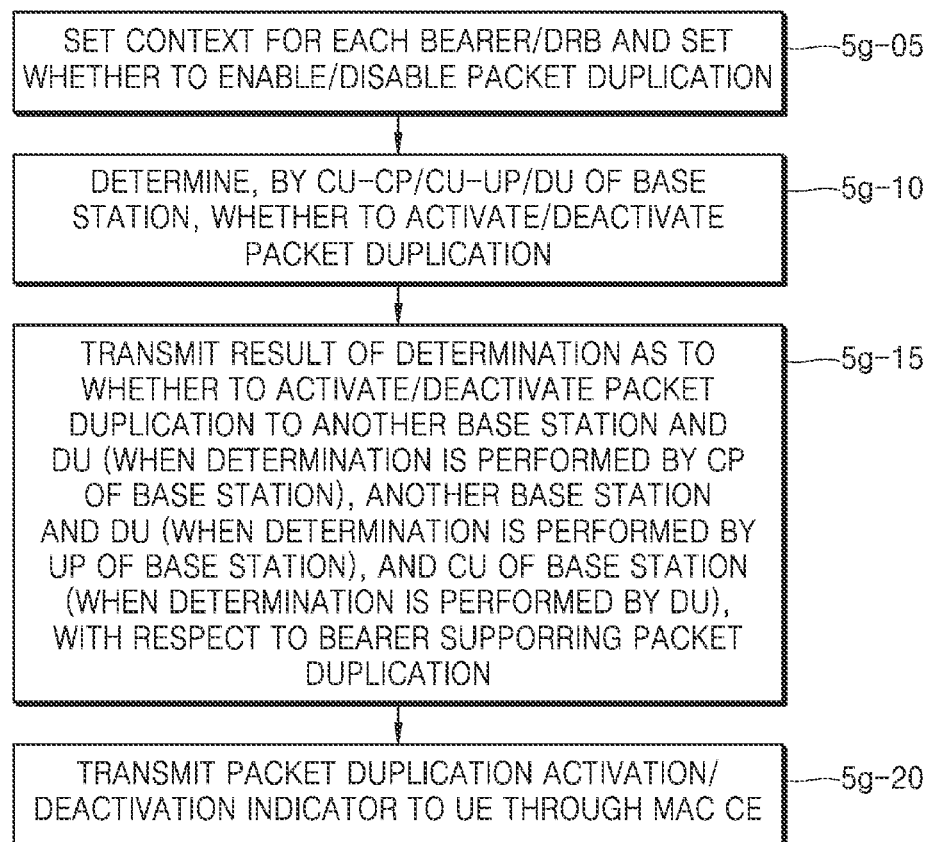
FIG. 7 is a diagram for explaining a packet duplication configuration and activation/deactivation configuration synchronization procedure according to an embodiment of the disclosure.

FIG. 7 is a diagram for explaining a packet duplication configuration and activation/deactivation configuration synchronization procedure according to an embodiment of the disclosure.

A procedure for configuring packet duplication support, determining whether to activate/deactivate packet duplication, and transmitting a packet duplication activation/deactivation indication to a UE through a MAC CE will be described with reference to FIG. 7 below.

In operation 5g-05, a base station may enable/disable packet duplication while setting context for each bearer/DRB.

In operation 5g-10, a CP, UP, or DU of the base station may determine whether to activate/deactivate packet duplication.

In operation 5g-15, the base station may transmit packet duplication activation/deactivation information to another base station, CU, or DU so as to synchronize packet duplication activation/deactivation for the same DRB between base stations providing services to one UE.

In operation 5g-20, the base station may transmit packet duplication activation/deactivation information for each DRB using packet duplication to a UE through an MAC CE. In operation 5g-15, similarly, other base stations receiving the packet duplication activation/deactivation information may transmit packet duplication activation/deactivation information for each DRB using packet duplication to the UE through the MAC CE.

Figure 8B:
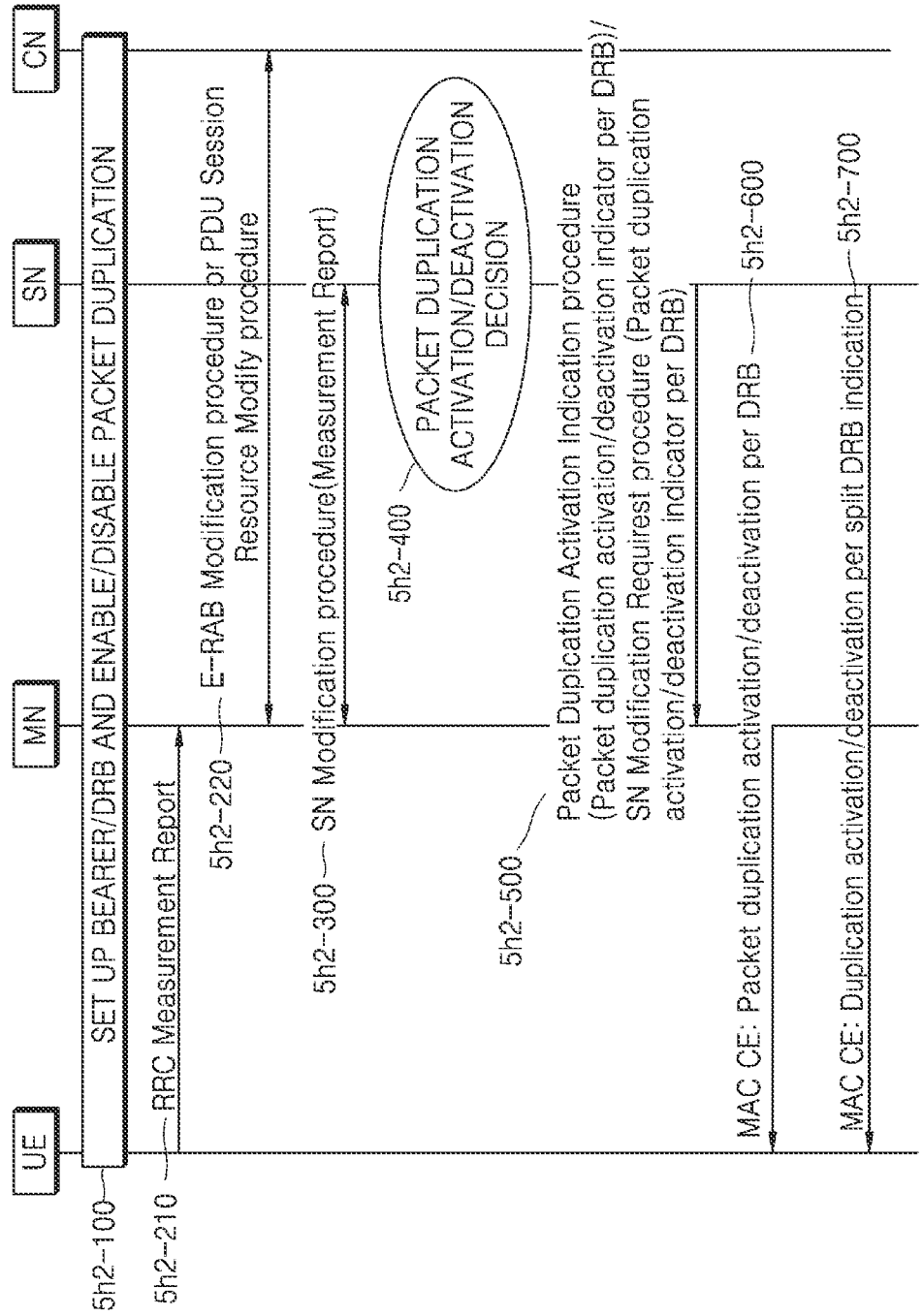
FIG. 8B is a diagram for explaining a procedure of determining, by a CP of a secondary node (SN) base station, whether to activate/deactivate packet duplication and performing synchronization under an integrated base station architecture, according to an embodiment of the disclosure.
Figure 9:
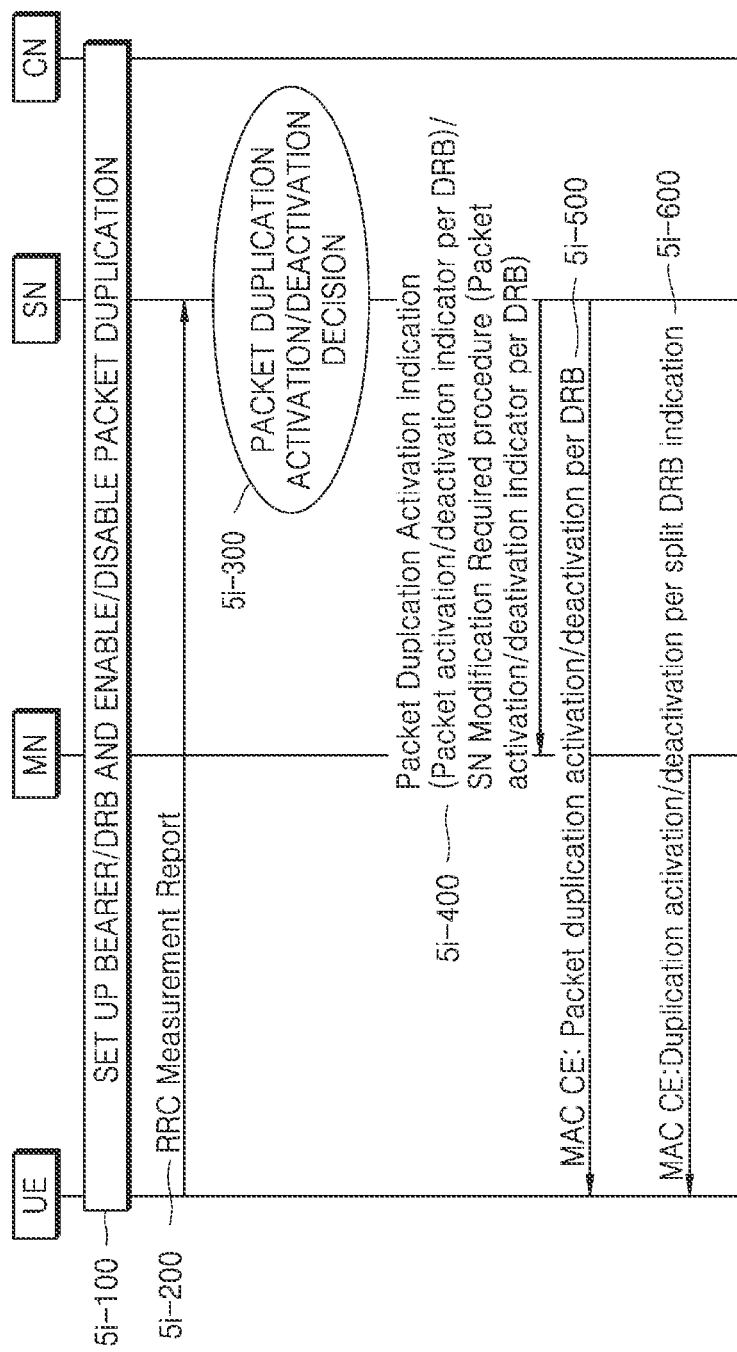
FIG. 9 is a diagram for explaining a procedure of determining, by a CP of an SN base station, whether to activate/deactivate packet duplication and performing synchronization under an integrated base station architecture, according to another embodiment of the disclosure.

FIG. 8A to 9 illustrate packet duplication activation/deactivation synchronization procedure according to a network installation configuration illustrated in FIG. 1 when a CU (CU-CP/RRC, a base-station controller or the like) of a base station determines whether to activate/deactivate packet duplication and transmit a result of the determination to another node (another base station, a DU or the like).

FIGS. 8A, 8B, and 9 illustrate examples of a call flow procedure of a packet duplication activation/deactivation synchronization process under the integrated base station architecture of (a) of FIG. 1.

FIG. 8A is a diagram for explaining a process of determining whether to activate/deactivate packet duplication in a CP of a MN base station and performing synchronization under an integrated base station architecture, according to an embodiment of the disclosure.

A call flow procedure when whether to activate/deactivate packet duplication is determined by a master node (MN) according to an embodiment of the disclosure will be described with reference to FIG. 8A below.

In FIG. 8A, in operation 5h-100, a UE and a base station may set a bearer/DRB and enable/disable packet duplication.

In operation 5h-300, an MN may determine whether to activate/deactivate packet duplication with respect to a corresponding DRB, based on a measurement report received from a UE in operation 5h-210 and PDU session/QoS flow information, EPS bearer information, a decision logic in the base station, and the like received from a core network (CN) in operation 5h-220.

In operation 5h-400, the MN may transmit packet duplication activation/deactivation information for each DRB to an SN through an X2/Xn interface. In this case, the packet duplication activation/deactivation information may be transmitted in a dedicated message as used in a packet duplication activation indication procedure or transmitted through an SN modification request procedure.

In operations 5h-500 and 5h-600, the MN and the SN may transmit an MAC CE including information on whether to activate/deactivate duplication of the same packet for each DRB to the UE.

FIG. 8B is a diagram for explaining a procedure of determining, by a CP of an SN base station, whether to activate/deactivate packet duplication and performing synchronization under an integrated base station architecture, according to an embodiment of the disclosure.

A call flow procedure when whether to activate/deactivate packet duplication is determined by an SN according to an embodiment of the disclosure will be described with reference to FIG. 8B below.

In FIG. 8B, in operation 5h2-100, a UE and a base station may set a bearer/DRB and enable/disable packet duplication.

In operation 5h2-300, based on a measurement report received from the UE in operation 5h2-210 or PDU session/QoS flow information, EPS bearer information, a decision logic in the base station, and the like received from a CN in operation 5h2-220, the MN may transmit information about the measurement report from the UE to an SN or transmit modified PDU session/QoS flow information, EPS bearer information or the like to be applied to an SN-terminated bearer through an SN modification procedure.

In operation 5h2-400, the SN may determine whether to activate/deactivate packet duplication for a corresponding SN-terminated DRB.

In operation 5h2-500, the SN may transmit packet duplication activation/deactivation information for each DRB to the MN through the X2/Xn interface. In this case, the packet duplication activation/deactivation information may be transmitted in a dedicated message as used in a packet duplication activation indication procedure or transmitted through an SN modification required procedure.

In operations 5h2-600 and 5h2-700, the MN and the SN may transmit an MAC CE including information on whether to activate/deactivate duplication of the same packet for each DRB to the UE.

FIG. 9 is a diagram for explaining a procedure of determining, by a CP of an SN base station, whether to activate/deactivate packet duplication and performing synchronization under an integrated base station architecture, according to another embodiment of the disclosure.

A call flow procedure when whether to activate/deactivate packet duplication is determined by an SN according to an embodiment of the disclosure will be described with reference to FIG. 9 below.

In FIG. 9, in operation 5i-100, a UE and a base station may set a bearer/DRB and enable/disable packet duplication.

In operation 5i-300, the SN may determine whether to activate/deactivate packet duplication for a corresponding DRB, based on a measurement report received from the UE, a decision logic or the like in operation 5i-200.

In operation 5i-400, the SN may transmit packet duplication activation/deactivation information for each DRB to the MN through the X2/Xn interface. In this case, the packet duplication activation/deactivation information may be transmitted in a dedicated message as used in a packet duplication activation indication procedure or transmitted through an SN modification required procedure.

In operations 5i-500 and 5i-600, the SN and the MN may transmit an MAC CE including information on whether to activate/deactivate duplication of the same packet for each DRB to the UE.

Figure 10:
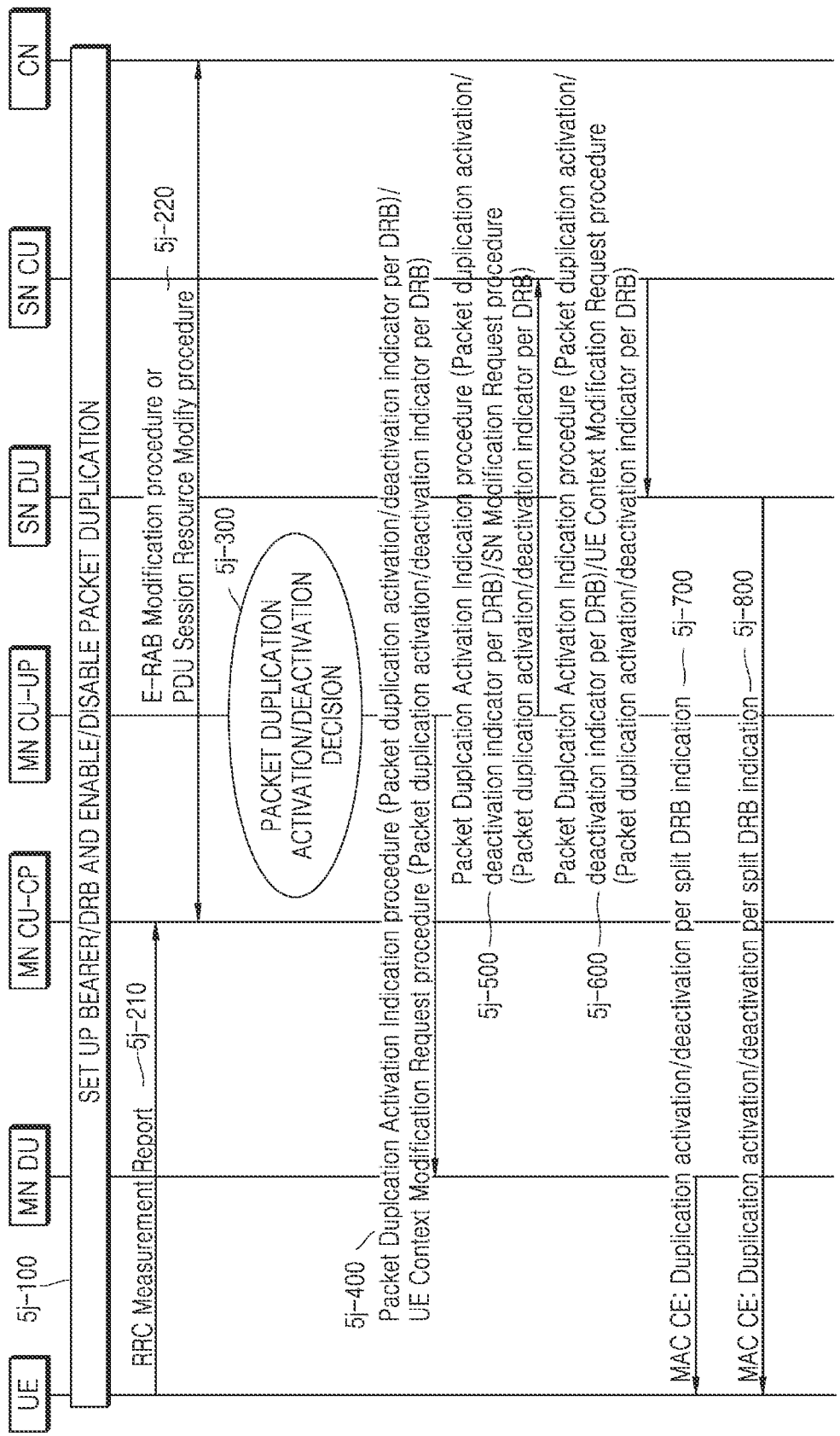
FIG. 10 is a diagram for explaining a procedure of determining, by a CP of an MN base station, whether to activate/deactivate packet duplication and performing synchronization under a CU-DU/CP-UP separated base station architecture, according to an embodiment of the disclosure.
Figure 11:
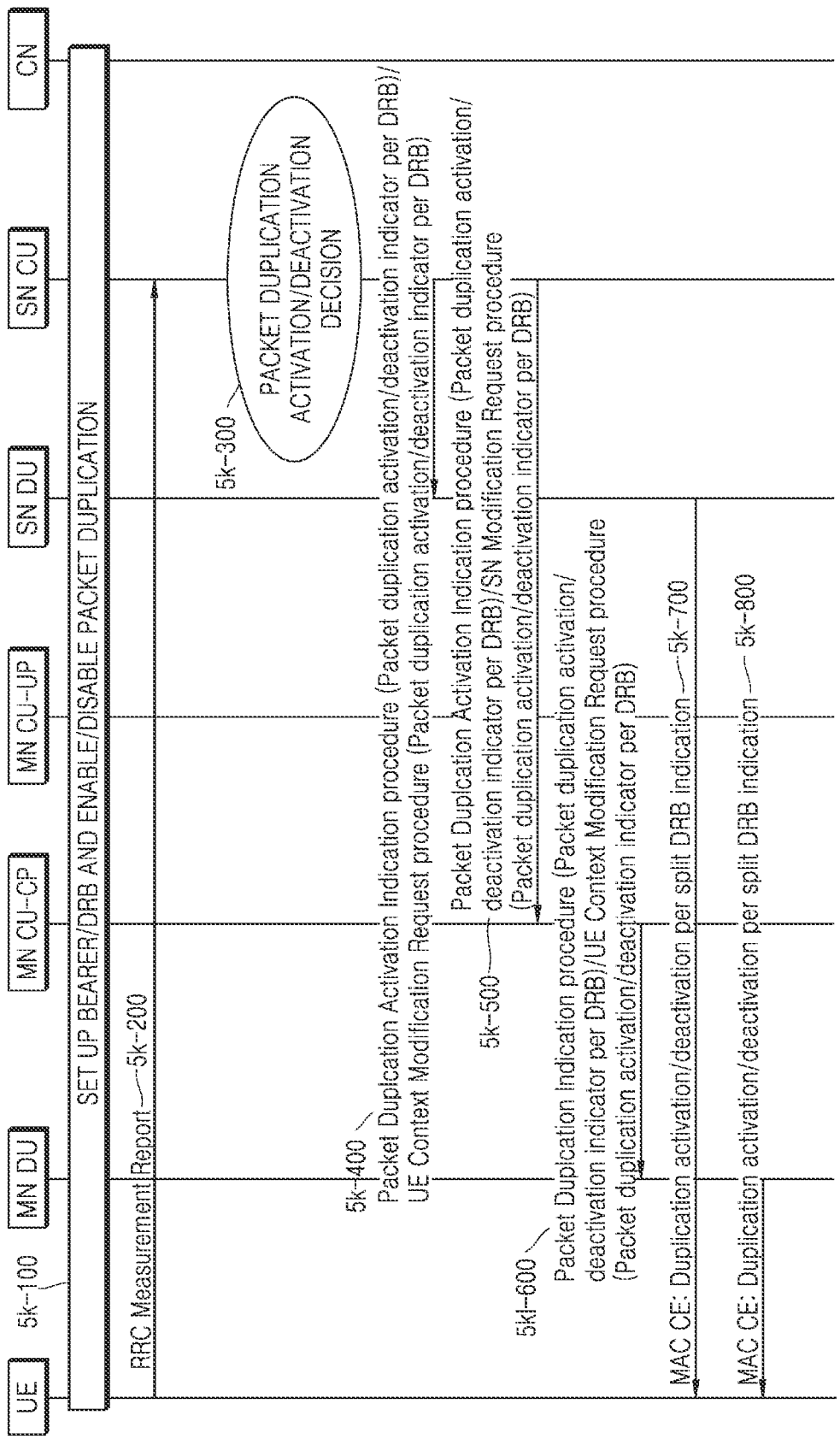
FIG. 11 is a diagram for explaining an example of a procedure of determining, by a CP of an SN base station, whether to activate/deactivate packet duplication and performing synchronization under a CU-DU/CP-UP separated base station architecture, according to an embodiment of the disclosure.

FIGS. 10 and 11 illustrate examples of a call flow procedure of a packet duplication activation/deactivation synchronization process under the CU-DU/CP-UP separated base station architecture of (b) of FIG. 1.

FIG. 10 is a diagram for explaining a procedure of determining, by a CP of an MN base station, whether to activate/deactivate packet duplication and performing synchronization under a CU-DU/CP-UP separated base station architecture, according to an embodiment of the disclosure.

A call flow procedure when whether to activate/deactivate packet duplication is determined by a CP of an MN will be described with reference to FIG. 10 below.

In FIG. 10, in operation 5j-100, a UE and a base station may set a bearer/DRB and enable/disable packet duplication.

In operation 5j-300, a CU-CP of an MN may determine whether to activate/deactivate packet duplication with respect to a corresponding DRB, based on a measurement report received from the UE in operation 5j-210 and PDU session/QoS flow information, EPS bearer information, a decision logic in the base station, and the like received from a CN in operation 5j-220.

In operation 5j-400, the CU-CP of the MN may transmit packet duplication activation/deactivation information for each DRB to a DU of the MN. In this case, the packet duplication activation/deactivation information may be transmitted in a dedicated message as used in a packet duplication activation indication procedure or transmitted through a UE context modification request procedure.

In operation 5j-500, the CU-CP of the MN may transmit packet duplication activation/deactivation information for each DRB to a CU of an SN through the X2/Xn interface. In this case, the packet duplication activation/deactivation information may be transmitted in a dedicated message as used in a packet duplication activation indication procedure or transmitted through an SN modification request procedure.

In operation 5j-600, the CU (or CU-CP) of the SN may transmit packet duplication activation/deactivation information for each DRB to a DU of the SN. In this case, the packet duplication activation/deactivation information may be transmitted in a dedicated message as used in a packet duplication activation indication procedure or transmitted through the UE context modification request procedure.

In operations 5j-700 and 5j-800, the DU of the MN and the DU of the SN may transmit an MAC CE including information on whether to activate/deactivate duplication of the same packet for each DRB to the UE.

FIG. 11 is a diagram for explaining an example of a procedure of determining, by a CP of an SN base station, whether to activate/deactivate packet duplication and performing synchronization under a CU-DU/CP-UP separated base station architecture, according to an embodiment of the disclosure.

A call flow procedure when whether to activate/deactivate packet duplication is determined by a CP of an SN will be described with reference to FIG. 11 below.

In FIG. 11, in operation 5k-100, a UE and a base station may set a bearer/DRB configuration and enable/disable packet duplication.

In operation 5k-300, a CU (or CU-CP) of an SN determines whether to activate/deactivate packet duplication for a corresponding DRB, based on a measurement report received from the UE in operation 5k-200 or a decision logic in the base station.

In operation 5k-400, the CU (or CU-CP) of the SN may transmit packet duplication activation/deactivation information for each DRB to a DU of the SN. In this case, the packet duplication activation/deactivation information may be transmitted in a dedicated message as used in a packet duplication activation indication procedure or transmitted through a UE context modification request procedure.

In operation 5k-500, the CU (or CU-CP) of the SN may transmit packet duplication activation/deactivation information for each DRB to a CU (or CU-CP) of an MN through the X2/Xn interface. In this case, the packet duplication activation/deactivation information may be transmitted in a dedicated message as used in a packet duplication activation indication procedure or transmitted through an SN modification required procedure.

In operation 5k-600, the CU (or CU-CP) of the MN may transmit packet duplication activation/deactivation information for each DRB to a DU of the MN. In this case, the packet duplication activation/deactivation information may be transmitted in a dedicated message as used in a packet duplication activation indication procedure or transmitted through a UE context modification request procedure.

In operations 5k-700 and 5k-800, the DU of the SN and the DU of the MN may transmit an MAC CE including information on whether to activate/deactivate duplication of the same packet for each DRB to the UE.

Figure 12:
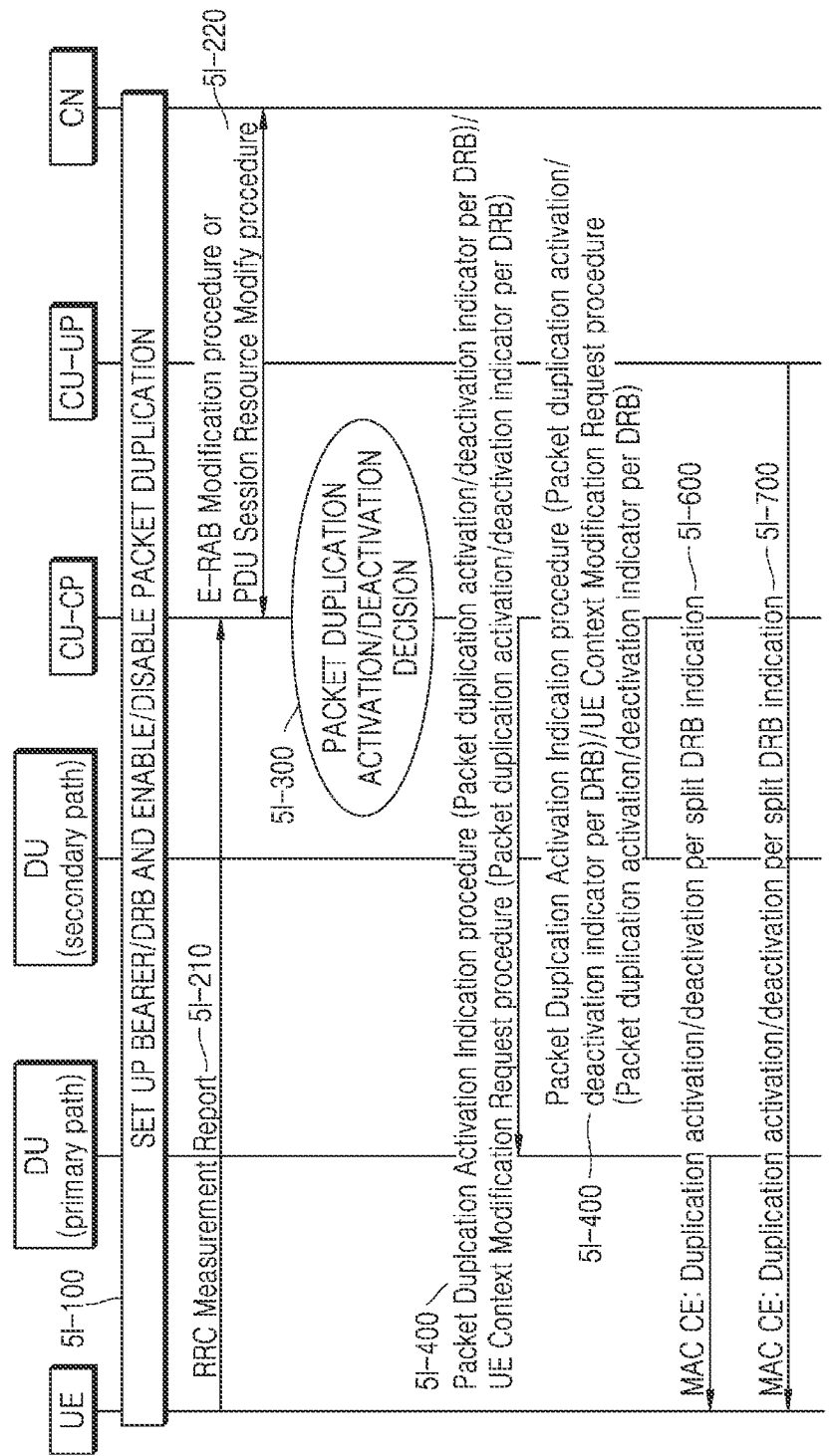
FIG. 12 is a diagram for explaining a procedure of determining, by a CU-CP of a base station, whether to activate/deactivate packet duplication and performing synchronization under a CU-DU/CP-UP separated base station architecture, according to an embodiment of the disclosure.

FIG. 12 is a diagram for explaining a procedure of determining, by a CU-CP of a base station, whether to activate/deactivate packet duplication and performing synchronization under a CU-DU/CP-UP separated base station architecture, according to an embodiment of the disclosure.

A call flow procedure of a packet duplication activation/deactivation synchronization process under the CU-DU/CP-UP separated single base station architecture of (a) of FIG. 1 and a call flow procedure when whether to activate/deactivate packet duplication is determined by a CP (CU-CP) in a CU will be described with reference to FIG. 12 below.

In FIG. 12, in operation 5l-100, a UE and a base station may set a bearer/DRB and enable/disable packet duplication.

In operation 5l-300, a CU-CP of the base station may determine whether to activate/deactivate packet duplication with respect to a corresponding DRB, based on a measurement report received from the UE in operation 5l-210 and PDU session/QoS flow information, EPS bearer information, a decision logic in the base station, and the like received from a CN in operation 5l-220.

In operations 5l-400 and 5l-500, the CU-CP may transmit packet duplication activation/deactivation information for each DRB to DUs providing a packet transmission service to one UE. In this case, the packet duplication activation/deactivation information may be transmitted in a dedicated message as used in a packet duplication activation indication procedure or transmitted through an UE context modification request procedure.

In operations 5*l*-600 and 5*l*-700, the DUs receiving the packet duplication activation/deactivation information from the CU-CP may transmit an MAC CE including information on whether to activate/deactivate duplication of the same packet for each DRB to the UE.

FIG. 13 is a diagram illustrating an example of an X2/Xn message for transmitting packet duplication activation/deactivation indication information according to an embodiment of the disclosure.

FIG. 13 illustrates a message, for transmitting packet duplication activation/deactivation indication information to synchronize packet duplication activation/deactivation for each bearer in an X2/Xn interface, together with a necessary information element.

(a) of FIG. 13 illustrates a message structure when a new packet duplication activation indication procedure is used to transmit packet duplication activation/deactivation information.

(b) and (c) of FIG. 13 illustrate a message structure when an SN modification request message used in an existing X2/Xn interface is used. In all the cases of FIG. 13, whether to activate/deactivate packet duplication may be indicated for each bearer/DRB.

FIG. 14 is a diagram illustrating an example of an F1 message for transmitting packet duplication activation/deactivation indication information according to an embodiment of the disclosure.

FIG. 14 illustrates a message, for transmitting packet duplication activation/deactivation indication information to synchronize packet duplication activation/deactivation for each bearer in an F1 interface, together with a necessary information element. In all the cases of FIG. 14, whether to activate/deactivate packet duplication may be indicated for each bearer/DRB.

FIGS. 15 to 20 illustrate examples of a packet duplication activation/deactivation synchronization procedure according to the network installation configuration of FIG. 1, when whether to activate/deactivate packet duplication is determined by a user plane (CU-UP, a PDCP layer or the like) of a base station and a result of the determination is transmitted to another node (another base station, a DU or the like).

Figure 15:
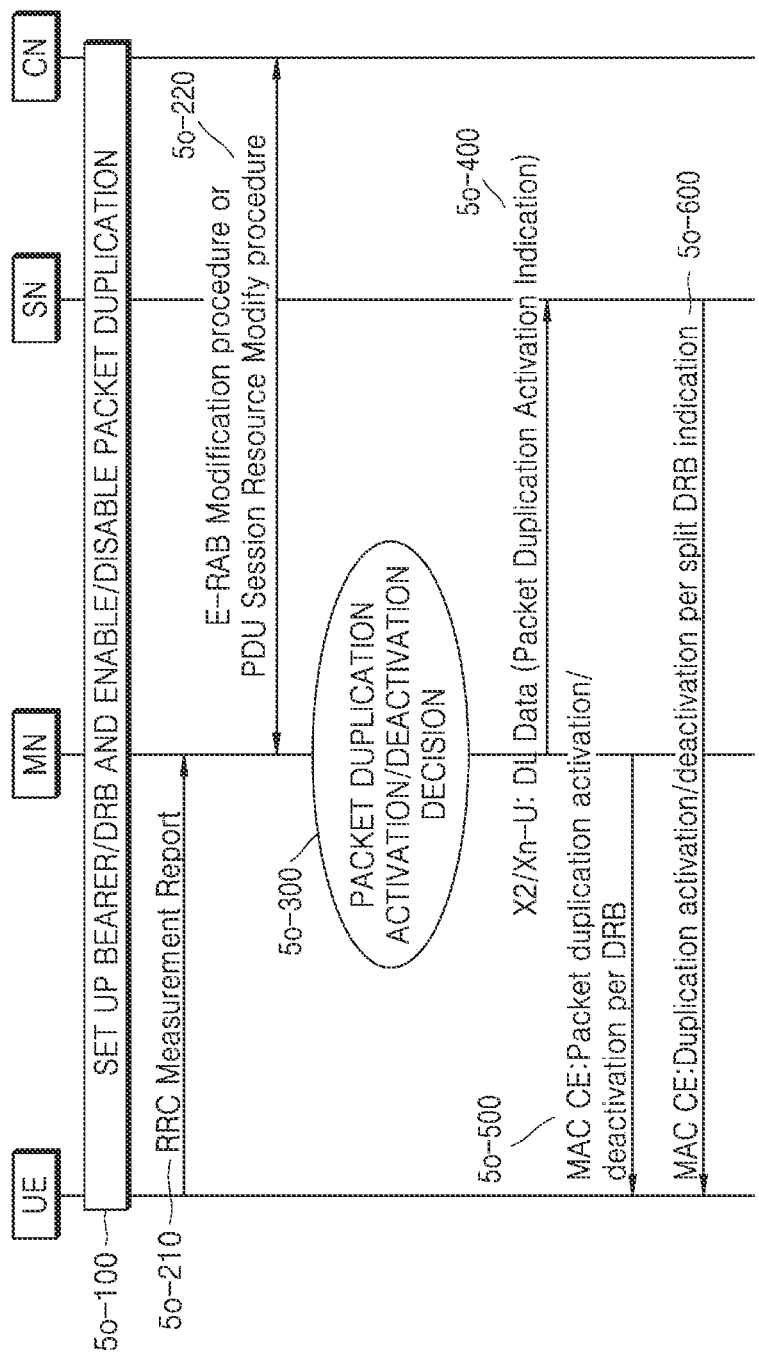
FIG. 15 is a diagram for explaining a procedure of determining, by a UP of an MN base station, whether to activate/deactivate packet duplication and performing synchronization under an integrated base station architecture, according to an embodiment of the disclosure.
Figure 16:
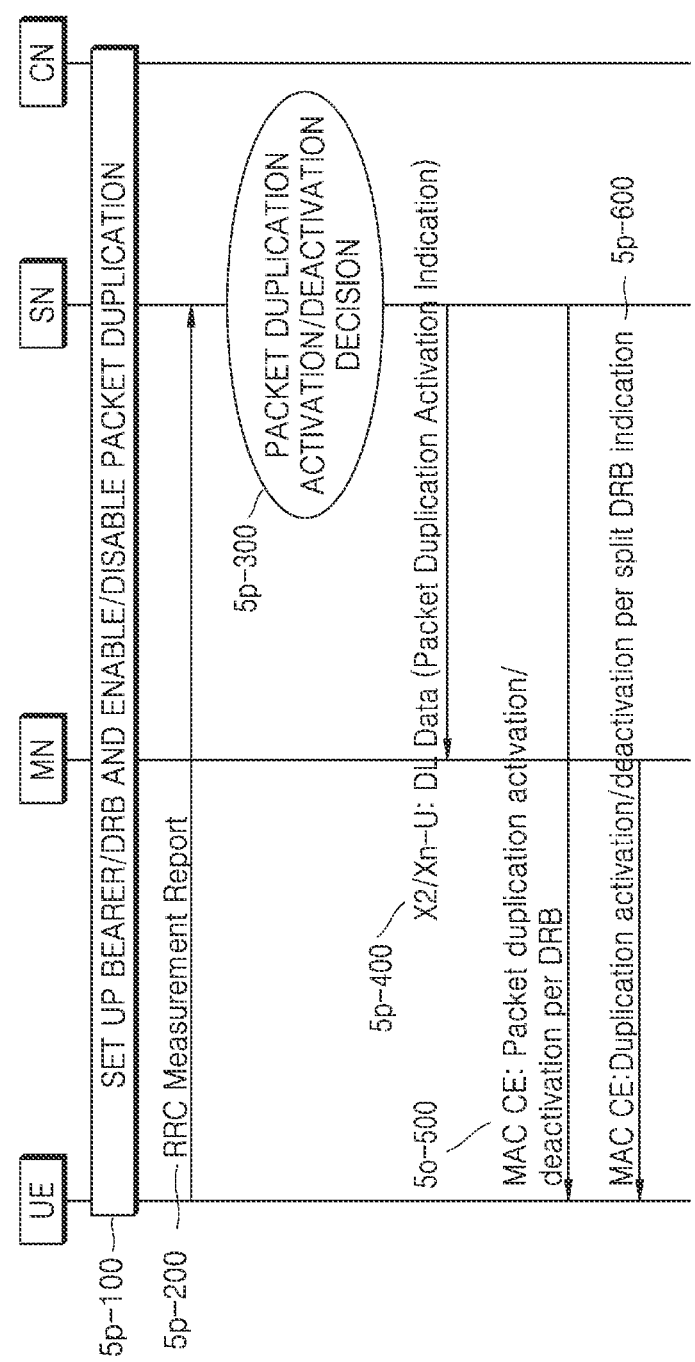
FIG. 16 is a diagram for explaining a procedure of determining, by a UP of an SN base station, whether to activate/deactivate packet duplication and performing synchronization under an integrated base station architecture, according to an embodiment of the disclosure.

FIGS. 15 and 16 illustrate examples of a call flow procedure of a packet duplication activation/deactivation synchronization process under the integrated base station architecture of (a) of FIG. 1.

FIG. 15 is a diagram for explaining a process of determining, by a UP of an MN base station, whether to activate/deactivate packet duplication and performing synchronization under an integrated base station architecture, according to an embodiment of the disclosure.

A call flow procedure when a bearer is serviced and whether to activate/deactivate packet duplication is determined using a PDCP of an MN will be described with reference to FIG. 15 below.

In operation 5*o*-100, a UE and a base station may set up a bearer/DRB and enable/disable packet duplication.

In operation 5*o*-300, an MN may determine whether to activate/deactivate packet duplication with respect to a corresponding DRB, based on a measurement report received from a UE in operation 5*o*-210 and PDU session/QoS flow information, EPS bearer information, a decision logic in the base station, and the like received from a CN in operation 5*o*-220.

In operation 5*o*-400, the MN may transmit packet duplication activation/deactivation information for each DRB to an SN through the X2/Xn UP interface. In this case, user data is transmitted in a DL data message including a packet duplication activation indicator and/or the SN is informed about whether to activate/deactivate packet duplication without transmitting the user data.

In operations 5*o*-500 and 5*o*-600, the MN and the SN may transmit an MAC CE including information on whether to activate/deactivate duplication of the same packet for each DRB to the UE.

FIG. 16 is a diagram for explaining a procedure of determining, by a UP of an SN base station, whether to activate/deactivate packet duplication and performing synchronization under an integrated base station architecture, according to an embodiment of the disclosure.

A call flow procedure when a bearer is serviced and whether to activate/deactivate packet duplication is determined using a PDCP of an SN will be described with reference to FIG. 16 below.

In operation 5*p*-100, a UE and a base station may set up a bearer/DRB and enable/disable packet duplication.

In operation 5*p*-300, the SN may determine whether to activate/deactivate packet duplication with respect to a corresponding DRB, based on a measurement report, a decision logic in the base station or the like received from the UE in operation 5*p*-200.

In operation 5*p*-400, the SN may transmit packet duplication activation/deactivation information for each DRB to an MN through the X2/Xn UP interface. In this case, user data is transmitted in a DL data message including a packet duplication activation indicator and/or the MN is informed about whether to activate/deactivate packet duplication without transmitting the user data.

In operations 5*o*-500 and 5*o*-600, the SN and the MN may transmit an MAC CE including information on whether to activate/deactivate duplication of the same packet for each DRB to an UE.

Figure 17:
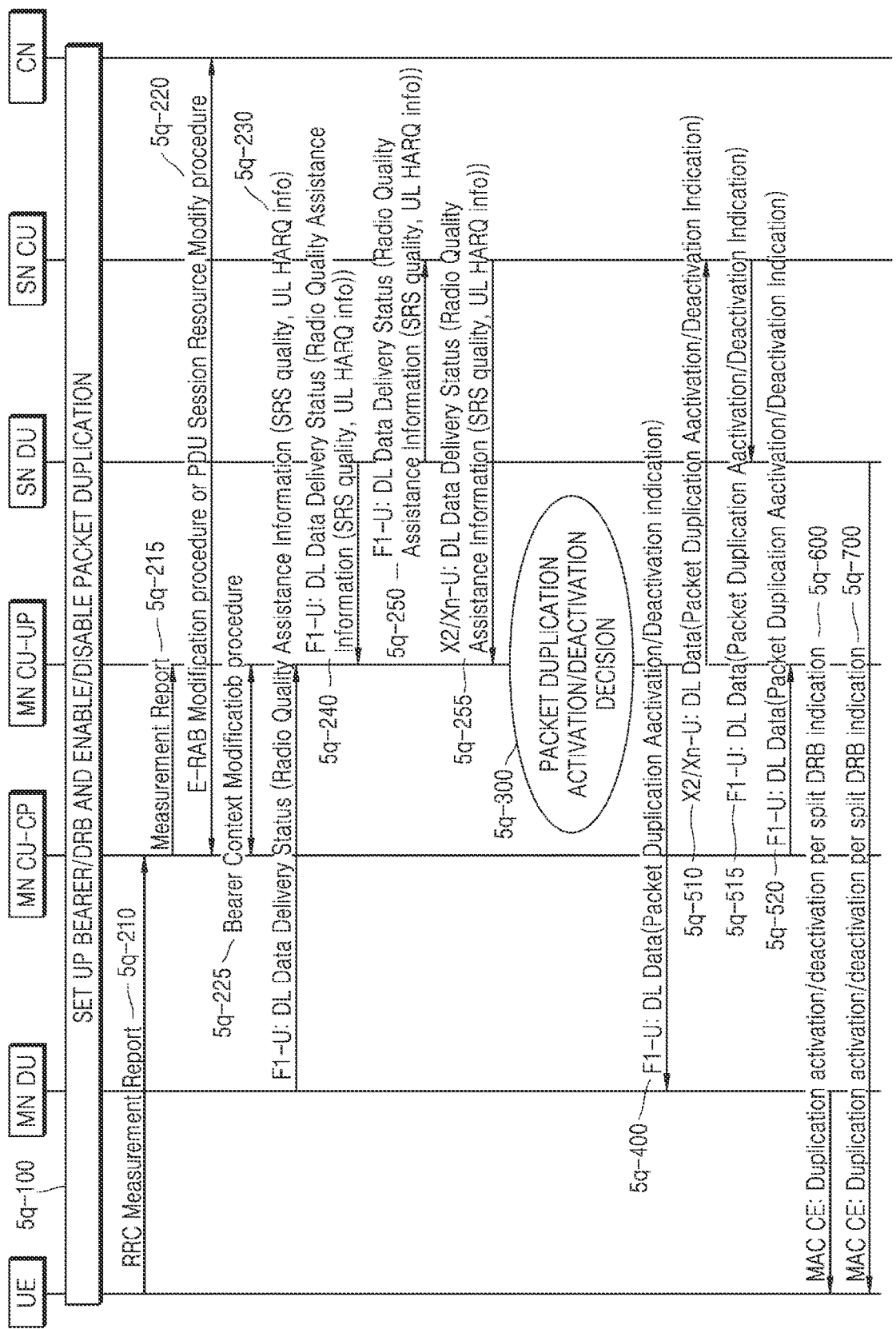
FIG. 17 is a diagram for explaining a procedure of determining, by a UP (CU-UP) of an MN base station, whether to activate/deactivate packet duplication and performing synchronization under a CU-DU/CP-UP separated base station architecture, according to an embodiment of the disclosure.
Figure 18:
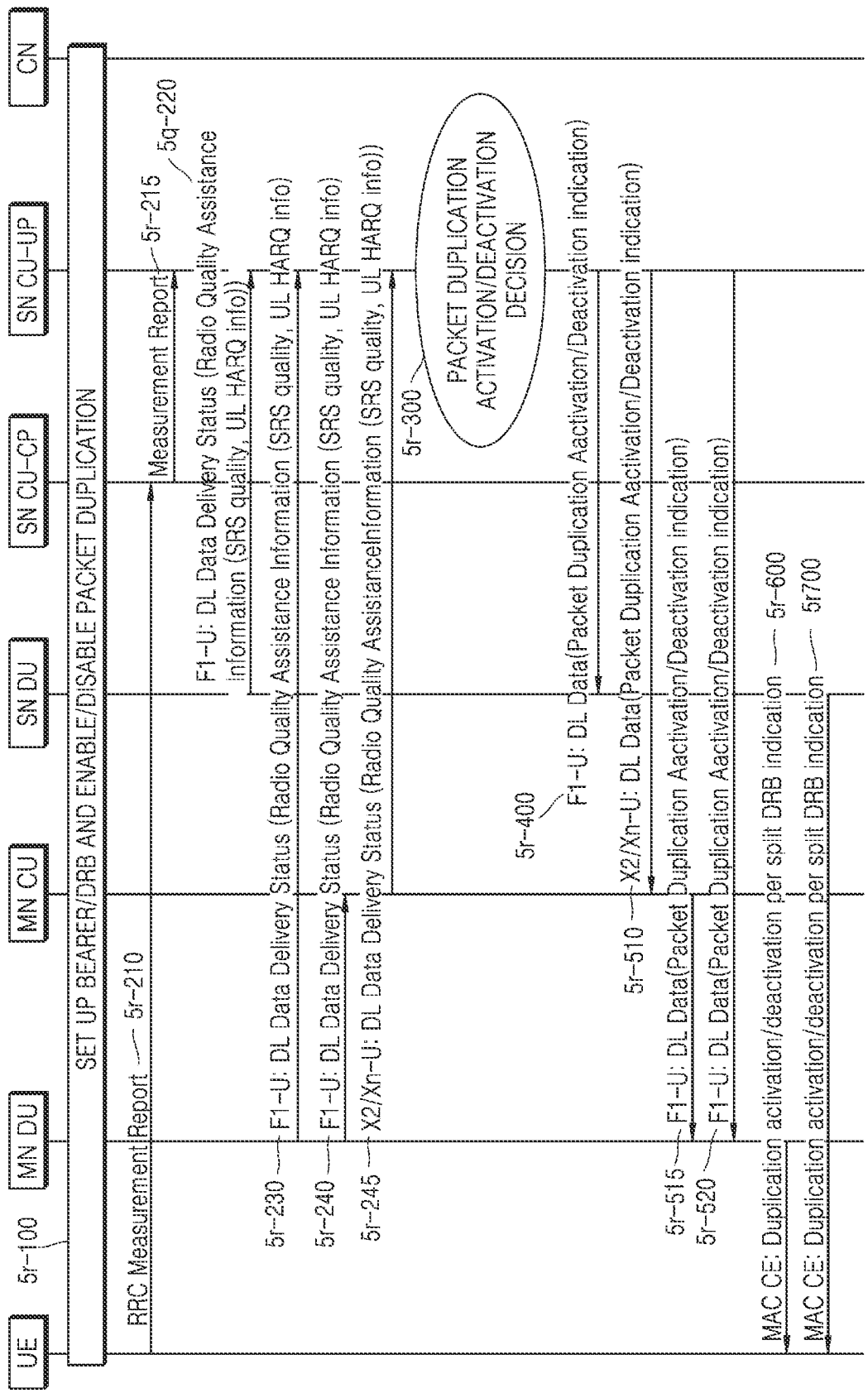
FIG. 18 is a diagram for explaining a procedure of determining, by a UP (CU-UP) of an SN base station, whether to activate/deactivate packet duplication and performing synchronization under a CU-DU/CP-UP separated base station architecture, according to an embodiment of the disclosure.

FIGS. 17 and 18 illustrate examples of a call flow procedure of a packet duplication activation/deactivation synchronization process under the CU-DU/CP-UP separated base station architecture of (b) of FIG. 1.

A call flow procedure when a bearer is serviced and whether to activate/deactivate packet duplication is determined using a PDCP of a CU-UP of an MN will be described with reference to FIG. 17 below.

In FIG. 17, in operation 5*q*-100, a UE and a base station may set a bearer/DRB and enable/disable packet duplication.

In operation 5*q*-300, a CU-UP of an MN may determine whether to activate/deactivate packet duplication with respect to a corresponding DRB, based on a measurement report received from a UE through the CU-CP of the Mn in operations 5*q*-210 and 5*q*-215, PDU session/QoS flow information and EPS bearer information received from a CN through the CU-CP of the MN in operations 5*q*-220 and 5*q*-225, radio quality information (e.g., information included in a DL data delivery status message) measured by a DU of the MN and received from the DU of the MN through a UP interface in operation 5*q*-230, radio quality information (e.g., information included in the DL data delivery status message) measured by a DU of an SN and received from the DU of the SN through the UP interface in operation 5q-240 or operations 5q-250 and 5q-255, a decision logic in the base station, and the like.

In operation 5q-400, the CU-UP of the MN may transmit packet duplication activation/deactivation information for each DRB to the DU of the MN through the F1 UP interface. In this case, user data is transmitted in a DL data message including a packet duplication activation indicator and/or the DU of the MN is informed about whether to activate/deactivate packet duplication without transmitting the user data.

In operations 5q-510 and 5q-515 or operation 5q-520, the CU-UP of the MN may transmit packet duplication activation/deactivation information for each DRB to the DU of the SN through an X2/Xn/F1 UP interface. In this case, user data is transmitted in a DL data message including a packet duplication activation indicator and/or the DU of the SN is informed about whether to activate/deactivate packet duplication without transmitting the user data.

In operations 5q-600 and 5q-700, the DU of the MN and the DU of the SN may transmit an MAC CE including information on whether to activate/deactivate duplication of the same packet for each DRB to the UE.

FIG. 18 is a diagram for explaining a procedure of determining, by a UP (CU-UP) of an SN base station, whether to activate/deactivate packet duplication and performing synchronization under a CU-DU/CP-UP separated base station architecture, according to an embodiment of the disclosure.

A call flow procedure when a bearer is serviced and whether to activate/deactivate packet duplication is determined using a PDCP of a CU-UP of an SN will be described with reference to FIG. 18 below.

In FIG. 18, in operation 5r-100, a UE and a base station may set a bearer/DRB and enable/disable packet duplication.

In operation 5r-300, a CU-UP of an SN may determine whether to activate/deactivate packet duplication with respect to a corresponding CRB, based on a measurement report received from a UE through the CU-CP of the SN in operations 5r-210 and 5r-215, radio quality information (e.g., information included in a DL data delivery status message) measured by a DU of the SN and received from the DU of the SN through a UP interface in operation 5r-220, radio quality information (e.g., information included in the DL data delivery status message) measured by a DU of an MN and received from the DU of the MN through a UP interface in operation 5r-230 or 5r-240 and 5r-245, a decision logic in a base station, and the like.

In operation 5r-400, the CU-UP of the SN may transmit packet duplication activation/deactivation information for each DRB to the DU of the SN through the F1 UP interface. In this case, user data is transmitted in a DL data message including a packet duplication activation indicator and/or the DU of the DU of the SN is informed about whether to activate/deactivate packet duplication without transmitting the user data.

In operations 5r-510 and 5r-515 or operation 5q-520, the CU-UP of the SN may transmit packet duplication activation/deactivation information for each DRB to the DU of the MN through the X2/Xn/F1 UP interface. In this case, user data is transmitted in a DL data message including a packet duplication activation indicator and/or the DU of the MN is informed about whether to activate/deactivate packet duplication without transmitting the user data.

In operations 5r-600 and 5r-700, the DU of the SN and the DU of the MN may transmit an MAC CE including information on whether to activate/deactivate duplication of the same packet for each DRB to the UE.

Figure 19:
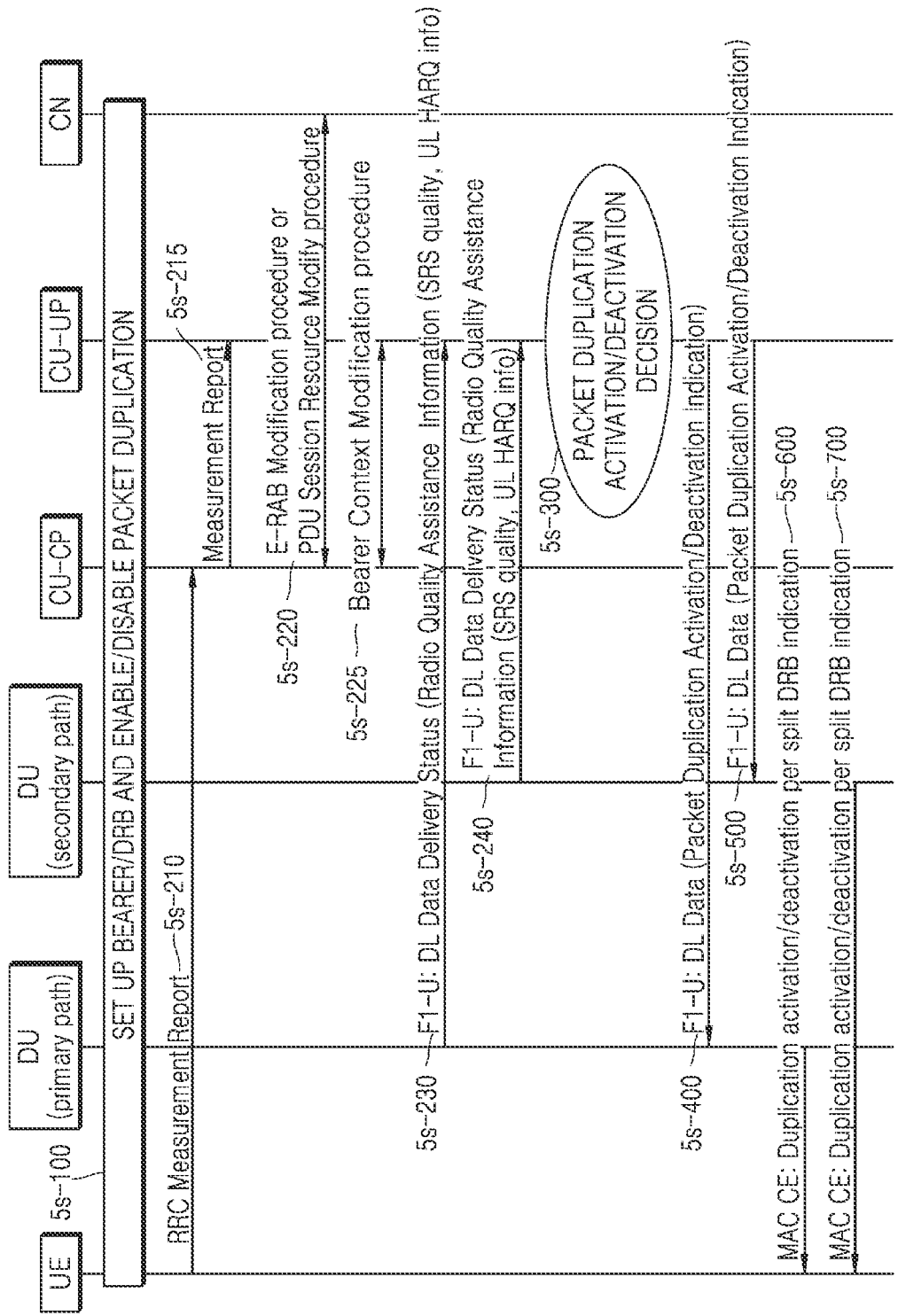
FIG. 19 is a diagram for explaining a procedure of determining, by a CU-UP of a base station, whether to activate/deactivate packet duplication and performing synchronization under a CU-DU/CP-UP separated single base station architecture, according to an embodiment of the disclosure.

FIG. 19 is a diagram for explaining a procedure of determining, by a CU-UP of a base station, whether to activate/deactivate packet duplication and performing synchronization under a CU-DU/CP-UP separated single base station architecture, according to an embodiment of the disclosure.

A call flow procedure of a packet duplication activation/deactivation synchronization process under the CU-DU/CP-UP separated single base station architecture of (c) of FIG. 1 and a call flow procedure when whether to activate/deactivate packet duplication is determined by a CP in a CU (CU-CP) will be described with reference to FIG. 19 below.

In operation 5s-100, a UE and a base station may set up a bearer/DRB and enable/disable packet duplication.

In operation 5s-300, a CU-UP may determine whether to activate/deactivate packet duplication with respect to a corresponding DRB, based on a measurement report received from the UE through a CU-CP in operations 5s-210 and 5s-215, PDU session/QoS flow information and EPS bearer information received from a CN through the CU-CP in operations 5s-220 and 5s-225, radio quality information (e.g., information included in a DL data delivery status message) measured by a DU of the base station and received from the DU of the base station through the UP interface in operation 5s-230 or 5s-240, a decision logic in the base station, and the like.

In operations 5s-400 and 5s-500, a CU-UP of the base station may transmit packet duplication activation/deactivation information for each DRB to the DU of the base station through the F1 UP interface. In this case, user data may be transmitted in a DL data message including a packet duplication activation indicator and/or the DU of the MN may be informed about whether to activate/deactivate packet duplication without transmitting the user data.

In operations 5s-600 and 5s-700, the DUs in the base station that have received a packet duplication activation indication may transmit an MAC CE including information on whether to activate/deactivate duplication of the same packet for each DRB to the UE.

FIG. 20 is a diagram illustrating an example of a downlink data delivery status message, which is a UP message used for determining whether to activate/deactivate packet duplication and for synchronization between nodes, according to an embodiment of the disclosure.

FIG. 20 illustrates a configuration of an UP message for transmitting assistance information from a DU to a CU-UP or from a node of another base station to a CU-UP, which determines whether to activate/deactivate, through a UP interface (NR-U, X2-U, Xn-U, F1-U or the like) so as to help the CU-UP determine whether to activate/deactivate packet duplication.

The configuration of the UP message of FIG. 20 is an example of a configuration, including radio transmission information (CQI, SRS reception quality, HARQ transmission success rate information, etc.), defined when a downlink data delivery status message defined in the NR-U is used. Alternatively, the configuration of the UP message of FIG. 20 may be used by defining, by a DU, a cause value indicating whether to activate/deactivate packet duplication between a CU (or a CU-UP) and a base station through a UP interface by using a cause field defined in the downlink data delivery status message.

FIG. 21 is a diagram illustrating an example of a downlink data message, which is a UP message used for synchronization between nodes in which packet duplication is to be activated/deactivated, according to an embodiment of the disclosure.

FIG. 21 illustrates a configuration of a message used when whether to activate/deactivate packet duplication is determined by a UP in a CU (CU-UP) and a result of the determination is transmitted to a DU or a node of another base station through a UP interface (NR-U, X2-U, Xn-U, F1-U or the like). The configuration of FIG. 21 is an example defined by adding packet duplication activation/deactivation indication information to a downlink data message defined in the NR-U.

Figure 22:
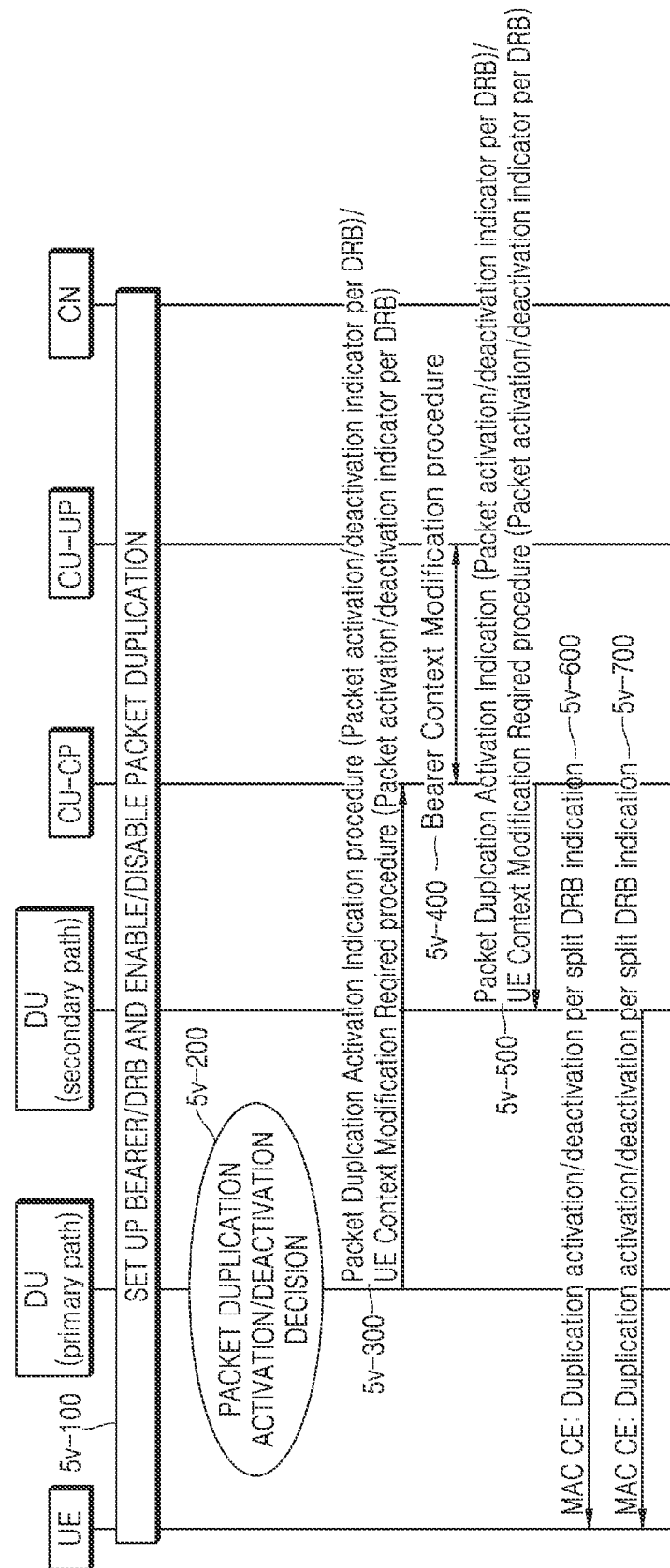
FIG. 22 is a diagram illustrating a procedure of determining, by a DU of a base station, whether to activate/deactivate packet duplication and performing synchronization through a CP interface under a CU-DU/CP-UP separated base station architecture, according to an embodiment of the disclosure.
Figure 23:
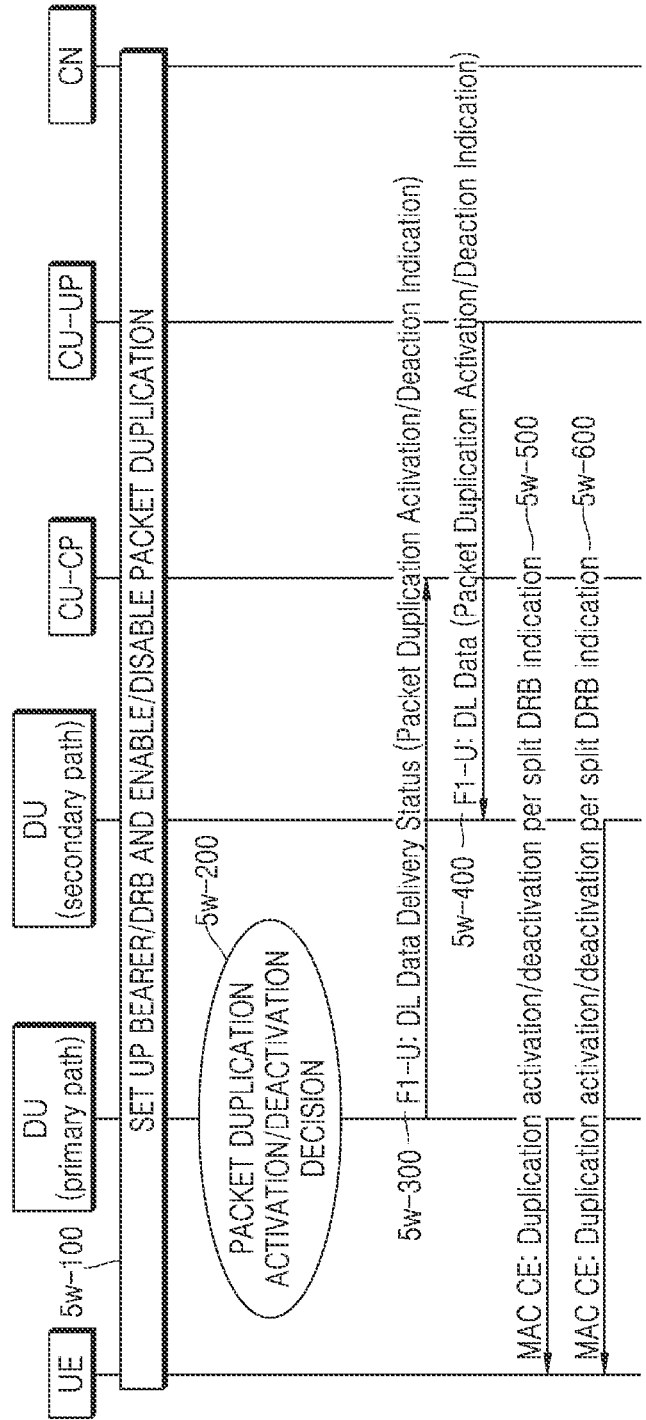
FIG. 23 is a diagram illustrating a procedure of determining, by a DU of a base station, whether to activate/deactivate packet duplication and performing synchronization through a UP interface under a CU-DU/CP-UP separated base station architecture, according to an embodiment of the disclosure.

FIGS. 22 and 23 are examples of a packet duplication activation/deactivation synchronization procedures the network installation configuration illustrated in FIG. 1 when whether to activate/deactivate packet duplication is determined by a DU (RLC/MAC layer support node) of a base station and a result of the determination is transmitted to another node (CU, another base station or the like).

FIG. 22 is a diagram illustrating a process of determining whether to activate/deactivate packet duplication through a CP interface in a DU of a base station and performing synchronization under a CU-DU/CP-UP separated base station architecture, according to an embodiment of the disclosure.

A call flow procedure of a packet duplication activation/deactivation synchronization process under the CU-DU/CP-UP separated single base station architecture of (c) of FIG. 1 will be described with reference to FIG. 22 below.

A call flow procedure when whether to activate/deactivate packet duplication is determined by a DU, a result of the determination is transmitted to a CU-CP through a CP interface (F1-C), and whether to activate/deactivate packet duplication is indicated by the CU-CP to another DU through the CP interface will be described with reference to FIG. 22 below.

In FIG. 22, in operation 5v-100, a UE and a base station may set a bearer/DRB and enable/disable packet duplication.

In operation 5v-200, a DU of the base station may determine whether to activate/deactivate packet duplication with respect to a corresponding DRB, based on radio quality information measured by the DU of the base station, a decision logic in the DU, etc.

In operation 5v-300, the DU of the base station may transmit packet duplication activation/deactivation information for each DRB to a CU-CP of the base station. In this case, the packet duplication activation/deactivation information may be transmitted in a dedicated message as used in a packet duplication activation indication procedure or through a UE context modification required procedure.

In operation 5v-400, the CU-CP may change bearer context so that a PDCP layer of the CU-UP may perform packet duplication when necessary.

In operation 5v-500, the CU-CP may transmit the packet duplication activation/deactivation information for each DRB to another DU servicing a corresponding DRB. In this case, the packet duplication activation/deactivation information may be transmitted in a dedicated message as used in the packet duplication activation indication procedure or through the UE context modification request procedure. In operations 5v-600 and 5v-700, the DUs in the base station that have received a packet duplication activation indication may transmit an MAC CE including information on whether to activate/deactivate duplication of the same packet for each DRB to the UE. When used in the integrated dual connectivity support base station architecture of (a) of FIG. 1 and the CU-DU/CP-UP separated dual connectivity support base station architecture (b) of FIG. 1, the CU-CP may transmit a packet duplication activation/deactivation indication for each bearer to a node of another base station through the X2/Xn interface so as to additionally perform synchronization between nodes, as determined by the CP of the base station as described above.

FIG. 23 is a diagram illustrating a procedure of determining whether to activate/deactivate packet duplication through a UP interface in a DU of a base station and performing synchronization under a CU-DU/CP-UP separated base station architecture, according to an embodiment of the disclosure.

A call flow procedure of a packet duplication activation/deactivation synchronization process under the CU-DU/CP-UP separated single base station architecture of (c) of FIG. 1 and a call flow procedure when a DU determines whether to activate/deactivate packet duplication and transmits a result of the determination to a CU-UP through a UP interface (F1-U/NR-U) and the CU-UP indicates whether to activate/deactivate a packet duplication to another DU through the UP interface will be described with reference to FIG. 23 below.

In operation 5w-100, a UE and a base station may set up a bearer/DRB and enable/disable packet duplication.

In operation 5w-200, a DU of the base station may determine whether to activate/deactivate packet duplication with respect to a corresponding DRB, based on radio quality information measured by the DU of the base station, a decision logic in the DU, etc.

In operation 5w-300, The DU of the base station may transmit packet duplication activation/deactivation information for each DRB to the CU-UP of the base station. In this case, the packet duplication activation/deactivation information may be included in a DL data delivery status message to indicate whether to activate/deactivate packet duplication.

In operation 5w-400, the CU-UP of the base station may transmit the packet duplication activation/deactivation information for each DRB to another DU of the base station servicing the same DRB through the F1 UP interface. In this case, user data is transmitted in a DL data message including a packet duplication activation indicator and/or the other DU is informed of whether to activate/deactivate packet duplication without transmitting the user data.

In operations 5w-500 and 5w-600, the DUs in the base station that have received a packet duplication activation indication may transmit an MAC CE including information on whether to activate/deactivate duplication of the same packet for each DRB to the UE.

When used in the integrated dual connectivity support base station architecture of (a) of FIG. 1 and the CU-DU/CP-UP separated dual connectivity support base station architecture of (b) of FIG. 1, the CU-CP may transmit a packet duplication activation/deactivation indication for each bearer to a node of another base station through the X2/Xn interface so as to additionally perform synchronization between nodes and the DU may directly transmit the packet duplication activation/deactivation indication to the node of the other base station by using the NR-U (F1-U/X2-U/Xn-U) so as to additionally perform synchronization between nodes, as determined by the UP of the base station as described above.

Figure 24:
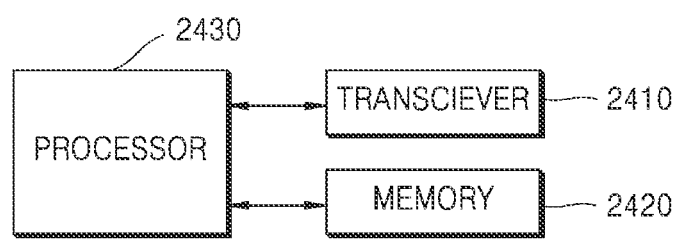
FIG. 24 is a block diagram of a UE according to an embodiment of the disclosure.

FIG. 24 is a block diagram illustrating a configuration of a UE according to an embodiment of the disclosure.

Referring to FIG. 24, a UE 2400 may include a transceiver 2410, a memory 2420, and a processor 2430. The transceiver 2410, the memory 2420, and the processor 2430 of the UE 2400 may operate according to a communication method of the UE 2400 as described above. However, components of the UE 2400 are not limited to the above-described examples of components. For example, the UE 2400 may include more components or fewer components than the components described above. Alternatively, the transceiver 2410, the memory 2420, and the processor 2430 may be embodied as one chip.

The transceiver 2410 may transmit signals to and receive signals from a base station. Here, the signals may include control information and data. To this end, the transceiver 2410 may include a radio-frequency (RF) transmitter that up-converts and amplifies a frequency of a signal to be transmitted, an RF receiver that low-noise amplifies a received signal and down-converts a frequency of the signal, and the like. However, the above description is merely intended to provide an example of the transceiver 2410, and components of the transceiver 2410 are not limited to the RF transmitter and the RF receiver.

The transceiver 2410 may receive a signal and output the signal to the processor 2430 through a radio channel, and transmit a signal output from the processor 2430 through the radio channel.

The memory 2420 may store programs and data necessary to operate the UE 2400. In addition, the memory 2420 may store control information or data included in a signal obtained by the UE 2400. The memory 2420 may include storage media such as a ROM, a RAM, a hard disk, a CD-ROM, and a DVD or a combination thereof.

The processor 230 may control a series of processes to operate the UE 2400 according to the above-described embodiments of the disclosure. According to some embodiments of the disclosure, the processor 2430 may control the components of the UE 2400 by using packet duplication activation/deactivation information, for each DRB using packet duplication, received using an MAC CE through the transceiver 2410.

Figure 25:
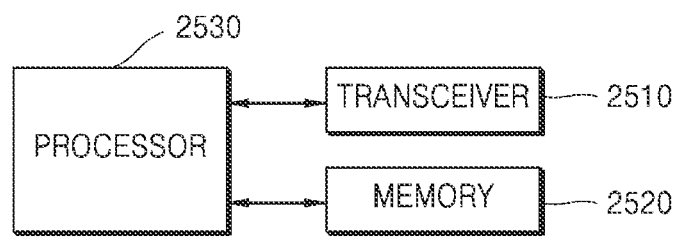
FIG. 25 is a block diagram of a base station according to an embodiment of the disclosure.

FIG. 25 is a block diagram illustrating a configuration of a base station according to an embodiment of the disclosure.

Referring to FIG. 25, a base station 2500 may include a transceiver 2510, a memory 2520, and a processor 2530. The transceiver 2510, the memory 2520, and the processor 2530 of the base station 2500 may operate according to a communication method of the base station 2500 as described above. However, components of the base station 2500 are not limited to the above-described examples of components. For example, the base station 2500 may include more components or fewer components than the components described above. Alternatively, the transceiver 2510, the memory 2520, and the processor 2530 may be embodied as one chip.

The transceiver 2510 may transmit signals to and receive signals from a UE. Here, the signals may include control information and data. To this end, the transceiver 2510 may include an RF transmitter that up-converts and amplifies a frequency of a signal to be transmitted, an RF receiver that low-noise amplifies a received signal and down-converts a frequency of the signal, and the like. However, the above description is merely intended to provide an example of the transceiver 2510, and components of the transceiver 2510 are not limited to the RF transmitter and the RF receiver.

In addition, the transceiver 2510 may receive a signal and output the signal to the processor 2530 through a radio channel, and transmit a signal output from the processor 2530 through the radio channel.

The memory 2520 may store programs and data necessary to operate the base station 2500. In addition, the memory 2520 may store control information or data included in a signal obtained by the base station 2500. The memory 2520 may include a storage medium, such as a ROM, a RAM, a hard disk, a CD-ROM, and a DVD, or a combination of such storage media.

The processor 2530 may control a series of processes to operate the base station 2500 according to the above-described embodiments of the disclosure. In some embodiments of the disclosure, the processor 2530 may control the components of the base station 2500 to be configured to support packet duplication, determine whether to activate/deactivate packet duplication, and transmit a packet duplication activation/deactivation indication to a UE through an MAC CE.

In addition, the processor 2530 may control the components of the base station 2500 to: configure whether to use packet duplication while setting context for each bearer/DRB; and to allow a CP, UP or DU of a base station to determine whether to activate/deactivate packet duplication, transmit packet duplication activation/deactivation information to another base station, CU or DU so as to synchronize packet duplication activation/deactivation between base stations servicing one UE with respect to the same DRB, and transmit, to the UE, packet duplication activation/deactivation information for each DRB using packet duplication through an MAC CE.

The embodiments of the disclosure set forth in the present specification and drawings are merely intended to provide examples to easily explain the technical matters of the disclosure and help understanding of the disclosure, and are not intended to limit the scope of the disclosure. That is, it will be obvious to those of ordinary skill in the art that other modified examples based on the technical spirit of the disclosure may be implemented. These embodiments of the disclosure can be implemented in combination as necessary. For example, part of the embodiments of the disclosure may be combined with each other to operate a base station and a UE. The above-described embodiments of the disclosure have been presented with respect to an NR system but other modified examples based on the technical idea of the embodiments of the disclosure may be implemented in other systems such as an FDD or TDD LTE system.

Although embodiments of the disclosure are set forth in the present specification and drawings and specific terms are used herein, they are merely provided in a general sense to easily explain the technical idea of the disclosure and help understanding of the disclosure and are not intended to limit the scope of the disclosure. It will be obvious to those of ordinary skill in the art that other modified examples based on the technical spirit of the disclosure can be implemented.

What is claimed is:

1. A method of a first base station activating or deactivating packet duplication in a wireless communication system, the method comprising:
transmitting, by a central unit (CU) of the first base station, to a distributed unit (DU) of the first base station, via an F1 interface, information to activate or deactivate a dual connectivity (DC) based packet duplication for a data radio bearer (DRB);
transmitting the information to a second base station; and
transmitting, to a user equipment (UE), a medium access control (MAC) control element (CE) indicating whether to activate or deactivate packet duplication for the DRB, based on the information.

2. The method of claim 1, wherein the first base station and the second base station are configured as DC for the UE.

3. The method of claim 1, wherein:
the first base station is a master node (MN),
the second base station is a secondary node (SN), and
the information, which is transmitted to the second base station, is included in SN modification request information.

4. The method of claim 1, wherein:
the first base station is a secondary node (SN),
the second base station is a master node (MN), and
the information, which is transmitted to the second base station, is included in SN modification required information.

5. The method of claim 1, wherein the MAC CE includes at least one bit, and each bit corresponds to each DRB.

6. The method of claim 1, wherein the information, which is transmitted to the DU, is included in UE context modification request information.

7. The method of claim 1, wherein the MAC CE indicates that packet duplication is to be activated or deactivated.

8. A method of a second base station activating or deactivating packet duplication in a wireless communication system, the method comprising:
receiving, from a first base station, information to activate or deactivate a dual connectivity (DC) based packet duplication for a data radio bearer (DRB);
transmitting the information, by a central unit (CU) of the second base station, to a distributed unit (DU) of the second base station, via an F1 interface; and
transmitting, to a user equipment (UE), a medium access control (MAC) control element (CE) indicating whether to activate or deactivate packet duplication for the DRB, based on the information.

9. The method of claim 8, wherein the first base station and the second base station are configured as DC for the UE.

10. The method of claim 8, wherein:
the first base station is a master node (MN),
the second base station is a secondary node (SN), and
the information, which is received from the first base station, is included in SN modification request information.

11. The method of claim 8, wherein:
the first base station is a secondary node (SN),
the second base station is a master node (MN), and
the information, which is received from the first base station, is included in SN modification required information.

12. The method of claim 8, wherein the MAC CE includes at least one bit, and each bit corresponds to each DRB.

13. The method of claim 8, wherein the information, which is transmitted to the DU, is included in UE context modification request information.

14. A first base station activating or deactivating packet duplication in a wireless communication system, the first base station comprising:
a transceiver; and
at least one processor connected to the transceiver, wherein the at least one processor is configured to:
transmit, by a central unit (CU) of the first base station, to a distributed unit (DU) of the first base station, information to activate or deactivate a dual connectivity (DC) based packet duplication for a data radio bearer (DRB);
transmit the information to a second base station; and
transmit, to a user equipment (UE), a medium access control (MAC) control element (CE) indicating whether to activate or deactivate packet duplication for the DRB, based on the information.

15. A second base station activating or deactivating packet duplication in a wireless communication system, the second base station comprising:
a transceiver; and
at least one processor connected to the transceiver, wherein the at least one processor is configured to:
receive, from a first base station, information to activate or deactivate a dual connectivity (DC) based packet duplication for a data radio bearer (DRB);
transmit the information, by a central unit (CU) of the second base station, to a distributed unit (DU) of the second base station, via an F1 interface; and
transmit, to a user equipment (UE), a medium access control (MAC) control element (CE) indicating whether to activate or deactivate packet duplication for the DRB, based on the information.

* * * * *